(12) United States Patent
Sobol et al.

(10) Patent No.: US 11,503,434 B2
(45) Date of Patent: Nov. 15, 2022

(54) METHOD AND SYSTEM FOR CONNECTIVITY BETWEEN A PERSONAL AREA NETWORK AND AN INTERNET PROTOCOL NETWORK VIA LOW POWER WIDE AREA NETWORK WEARABLE ELECTRONIC DEVICE

(71) Applicant: CareBand Inc., Chicago, IL (US)

(72) Inventors: Adam G. Sobol, Dayton, OH (US); Paul Sheldon, Arlington Heights, IL (US); Harish Natarahjan, Hoffman Estates, IL (US); Joseph T. Kreidler, Arlington Heights, IL (US); Brian A. Donlin, Chicago, IL (US); Jon G. Ledwith, Palatine, IL (US); Patrick J. McVey, Wheeling, IL (US); Ross D. Moore, Winnetka, IL (US); Peter Nanni, Algonquin, IL (US); Dwayne D. Forsyth, Deer Park, IL (US); Todd Sobol, Dayton, OH (US); John D. Reed, Dayton, OH (US); Reid B. Erekson, Arlington Heights, IL (US)

( * ) Notice: Subject to any disclaimer, the term of this patent is extended or adjusted under 35 U.S.C. 154(b) by 0 days.

(21) Appl. No.: 17/236,358

(22) Filed: Apr. 21, 2021

(65) Prior Publication Data
US 2021/0337355 A1    Oct. 28, 2021

Related U.S. Application Data

(60) Provisional application No. 63/101,273, filed on Apr. 22, 2020.

(51) Int. Cl.
*H04B 7/00*        (2006.01)
*H04W 4/029*     (2018.01)
*H04W 4/021*     (2018.01)
*H04W 4/02*       (2018.01)
*H04W 4/80*       (2018.01)

(52) U.S. Cl.
CPC .......... *H04W 4/029* (2018.02); *H04W 4/021* (2013.01); *H04W 4/023* (2013.01); *H04W 4/80* (2018.02)

(58) Field of Classification Search
CPC ....... H04W 4/029; H04W 4/80; H04W 4/021; H04W 4/023
USPC ....................................................... 455/41.2
See application file for complete search history.

(56) References Cited

U.S. PATENT DOCUMENTS

| | | | | |
|---|---|---|---|---|
| 8,903,416 B1* | 12/2014 | Perkins | ................... | H04L 67/12 340/572.1 |
| 9,652,955 B1* | 5/2017 | Ray | ........................ | H04W 4/70 |
| 9,722,803 B1* | 8/2017 | Ellingson | ................ | H04L 9/088 |

(Continued)

*Primary Examiner* — April G Gonzales
(74) *Attorney, Agent, or Firm* — John D. Reed

(57) ABSTRACT

A personal area network that includes a wearable electronic device, a system and methods of using the personal area network that includes a wearable electronic device. The wearable electronic device can act as an aggregator of the data that is being acquired by the one or more sensors and from other devices that are within wireless signal range of the personal area network in order to send some or all of the data over a wireless low power wide area network to remote locations within a larger network for subsequent processing, user notification, analysis of location-determination, contact tracing or the like. Data may flow in a bidirectional manner between the wearable electronic device and at least some of the other devices within the personal area network.

20 Claims, 14 Drawing Sheets

(56) References Cited

U.S. PATENT DOCUMENTS

| | | | | |
|---|---|---|---|---|
| 9,928,359 B1* | 3/2018 | Vargas | | G06F 21/78 |
| 10,335,060 B1* | 7/2019 | Kahn | | A61B 5/7246 |
| 10,532,266 B2* | 1/2020 | Genova | | H04W 4/21 |
| 11,147,459 B2* | 10/2021 | Sobol | | H04W 84/12 |
| 2007/0287923 A1* | 12/2007 | Adkins | | A61B 5/022 |
| | | | | 600/485 |
| 2011/0234397 A1* | 9/2011 | Fetzer | | G08B 25/016 |
| | | | | 340/539.13 |
| 2011/0245633 A1* | 10/2011 | Goldberg | | A61B 5/165 |
| | | | | 600/323 |
| 2015/0143125 A1* | 5/2015 | Nix | | H04L 12/2854 |
| | | | | 713/171 |
| 2015/0244699 A1* | 8/2015 | Hessler | | H04W 12/062 |
| | | | | 726/7 |
| 2015/0334554 A1 | 11/2015 | Song | | |
| 2015/0350857 A1* | 12/2015 | Lim | | H04W 4/80 |
| | | | | 455/41.2 |
| 2016/0018278 A1* | 1/2016 | Jeter, II | | G16H 40/63 |
| | | | | 340/665 |
| 2016/0139273 A1* | 5/2016 | Sobol | | G01S 19/14 |
| | | | | 342/357.52 |
| 2016/0142868 A1* | 5/2016 | Kulkarni | | G01S 5/0252 |
| | | | | 455/456.5 |
| 2016/0173359 A1* | 6/2016 | Brenner | | A61B 5/02438 |
| | | | | 709/224 |
| 2016/0270126 A1* | 9/2016 | Adams | | H04W 76/50 |
| 2016/0294828 A1* | 10/2016 | Zakaria | | H04W 12/06 |
| 2016/0314255 A1* | 10/2016 | Cook | | G06F 16/906 |
| 2017/0006003 A1 | 1/2017 | Zakaria | | |
| 2017/0006595 A1* | 1/2017 | Zakaria | | H04L 67/025 |
| 2017/0013569 A1* | 1/2017 | Braxton | | G08B 21/0263 |
| 2017/0017822 A1* | 1/2017 | Zimmerman | | G06K 7/1452 |
| 2017/0053267 A1* | 2/2017 | Abel | | G06Q 20/4014 |
| 2017/0109656 A1* | 4/2017 | Cook | | G06N 5/02 |
| 2017/0134171 A1* | 5/2017 | Woxland | | H04W 12/086 |
| 2017/0163685 A1* | 6/2017 | Schwartz | | H04L 63/0227 |
| 2017/0173262 A1* | 6/2017 | Veltz | | G16H 20/17 |
| 2017/0193787 A1* | 7/2017 | Devdas | | G08B 25/005 |
| 2017/0202484 A1* | 7/2017 | Al-Shaery | | A61B 5/08 |
| 2017/0208426 A1* | 7/2017 | Komoni | | H04W 4/80 |
| 2017/0237719 A1* | 8/2017 | Schwartz | | H04L 63/0485 |
| | | | | 713/153 |
| 2017/0272842 A1 | 9/2017 | Touma et al. | | |
| 2018/0001184 A1* | 1/2018 | Tran | | G09B 19/0038 |
| 2018/0042513 A1* | 2/2018 | Connor | | A61B 5/6824 |
| 2018/0085058 A1* | 3/2018 | Chakravarthi | | G16H 40/67 |
| 2018/0160907 A1* | 6/2018 | Verma | | G16H 40/67 |
| 2018/0168464 A1* | 6/2018 | Barnett, Jr. | | A61B 5/6861 |
| 2018/0247713 A1* | 8/2018 | Rothman | | A61B 5/02055 |
| 2018/0330293 A1* | 11/2018 | Kulkarni | | G06Q 10/0633 |
| 2018/0332434 A1* | 11/2018 | Kulkarni | | H04L 43/10 |
| 2018/0375849 A1* | 12/2018 | Koskimies | | H04L 9/3234 |
| 2019/0057189 A1* | 2/2019 | Frederickson | | A61B 5/1112 |
| 2019/0147721 A1* | 5/2019 | Avitan | | G06F 1/3209 |
| | | | | 340/573.1 |
| 2019/0150134 A1* | 5/2019 | Kakinada | | H04W 72/048 |
| | | | | 370/330 |
| 2020/0178906 A1* | 6/2020 | Bevan | | A61B 5/02055 |
| 2020/0268261 A1* | 8/2020 | Ikegami | | H04W 4/70 |
| 2022/0080235 A1* | 3/2022 | Sobol | | E04B 1/68 |

* cited by examiner

CONTACT REPORT

CASE: ANN
COVID-19 STATUS: CONFIRMED
DATE OF THE SYMPTOM ONSET: JUNE 5
EXPECTED INFECTIOUS PERIOD: JUNE 3 – ONGOING

| CONTACT | CONTACT DATE(S) | CONTACT TYPE | AVG DAILY CONTACTS | AGE RANGE | OTHER RISK FACTORS |
|---|---|---|---|---|---|
| CHARLY | JUNE 5 JUNE 3 | CLOSE PROXIMATE | 3 | 65-74 | NO |
| BETTY | JUNE 5 | DIRECT | 4 | 75-84 | YES |
| ALFRED | JUNE 4 | PROXIMATE | 3 | 75-84 | NO |
| ROSA | JUNE 4 | CLOSE | 11 | <65 | NO |

FIG. 8

METHOD AND SYSTEM FOR CONNECTIVITY BETWEEN A PERSONAL AREA NETWORK AND AN INTERNET PROTOCOL NETWORK VIA LOW POWER WIDE AREA NETWORK WEARABLE ELECTRONIC DEVICE

This application claims the benefit of U.S. Provisional Application Ser. No. 63/101,273 that was filed on Apr. 22, 2020.

The present disclosure relates generally to a wearable electronic device and corresponding personal area network (PAN) for monitoring data pertaining to and received by a wearer of the device, and more particularly to a PAN where the wearable electronic device automatically and wirelessly communicates such data to a larger network through low power wide area network (LPWAN) connectivity to provide location-based safety and health solutions.

BACKGROUND

The relatively recent emergence of the Internet of Things (IoT) has made it possible for sensor-based devices to collect unprecedented amounts of data. Unfortunately, traditional telecommunication architectures such as a cellular one using a smartphone—sometimes in conjunction with a shorter-range network and protocols such as a local area network (LAN) that may include Bluetooth (including its low-energy (BLE) variant), radar-based or WiFi or related networks based on ANT™, Infrared Data Association (IrDA), radio-frequency identification (RFID), Zigbee, Z-Wave or the like—are not capable of acting as an intermediary for promptly and efficiently offloading the generated data to a remote location where the information contained within the data may be put to use. For example, data collected from endpoint IoT devices often requires long-range transmission capability while also being power-limited. While some of the aforementioned protocols may meet a limited number of power requirements, they are incapable of long-range (that is to say, a kilometer or more) signal transmission. Similarly, cellular-based protocols may satisfy long-range requirements, but their high power consumption make them prohibitive for devices that need long battery life. As such, without a significant redesign and rebuild of the hardware, issues such as cost, security, battery power, bandwidth utilization or the like may hamper the ability of IoT-compatible devices to connect to an end user of the collected data through these limiting intermediaries on their way to an internet protocol (IP)-based network. Moreover, in cases where these devices are being used in medical or related health-care situations, they may have already been subjected to rigorous FDA medical device approval and clearance in their current embodiments. At least in these situations, it may be difficult, expensive and time-consuming to repurpose the devices to be able to serve populations of people using them, particularly for such people who may have neither ready access nor inclination to connect via LAN, cellular or other traditional telecommunication architectures.

A PAN allows communication between a larger network (such as the internet) and one or more end user devices. The PAN needs a way to get the data that is coming from these devices to the larger network and that may use or otherwise manage the data, including storage, cleansing, training and inference for analysis and related end-use. Traditionally, such connection necessitates additional infrastructure within the PAN in the form of high-bandwidth, comprehensive communication protocols. These protocols typically leverage licensed parts of the spectrum through an extensive array of wired or hybrid networks, including those associated with a public switched telephone network (PSTN) or mobile wireless network such as those that operate under the $3^{rd}$ Generation Partnership Project (3GPP) and their related standards such as Long-Term Evolution (LTE) or the Global System for Mobile Communications (GSM). The corresponding additional cost and complexity associated with such infrastructure is in many cases prohibitively expensive and inconvenient for the user of the PAN.

Contact tracing is the process of identifying individuals who may have been exposed to a contagious disease or related communicable agent, typically through another infected individual, animal or other source. A non-exhaustive list of such diseases includes tuberculosis, as well as vaccine-preventable infections such as measles, sexually transmitted infections, blood-born infections, some serious bacterial infections, viruses and novel infections such as the coronavirus that produces COVID-19, SARS-COV or the like. With contact tracing, once a person has been identified as having a confirmed case of a communicable disease, proximity information (which may be thought of as a subset of location information) may be gathered on other individuals who may have had sufficient interaction with the confirmed person so that these other individuals may in turn be monitored for signs or symptoms associated with infection of the disease Known approaches of determining the location of persons under a contact tracing analysis involve the use of conventional cellular-based devices and communication protocols similar to the aforementioned IoT and PAN scenarios. The challenges or limitations with such devices and approaches may include: the inability to get fine (that is to say, granular) indoor location information; the use of an active rather than passive process for the application software which in turn necessitates that it is always operational rather than merely residing in the background; and the consumption of significant amounts of battery power and the need for universally unique identifiers (UUIDs) in order for the receiving device to know which other broadcasting device to listen for, particularly if the other device does not intend on advertising to the public.

SUMMARY

With the foregoing in mind, the authors of the present disclosure have developed a PAN that may be used to collect data from nearby sensors or other devices and then wirelessly send the data to a larger network without having to rely upon cellular infrastructure as an intermediary telecommunication platform. Understanding that a sensor-enabled PAN needs a way to get the data that their sensors have collected to a remote location for subsequent management, storage or use of such data, the authors of the present disclosure discovered a simple low-cost communication network that allows wireless connectivity and data transfer between the PAN and the remote location using LPWAN as the intermediary.

The authors of the present disclosure have further developed the PAN to be a particularly efficacious way to perform real-time disease identification and propagation monitoring. By tracking the location of infected persons using the wearable electronic device PAN and LPWAN disclosed herein, significant reductions in disease spread may be achieved through one or more of interrupting ongoing transmission of the disease, alerting contacts to the possibility of infection, offering preventative counseling or prophylactic care, assisting in diagnosis, counseling and treatment to already-infected individuals to help prevent their reinfection, as well to learn about the epidemiology of a disease in a particular population. As such, in situations where time is of the essence, the devices, systems and methods disclosed herein for identifying contacts allow decision-makers to ensure that infected persons do not interact with others in order to reduce or eliminate further spread. In this way, a disease outbreak and spread may be traced quickly as a way to assist public health officials with more adequately addressing the spread of an infection, even in regions or areas that do not have significant existing communication infrastructure.

The PAN disclosed herein uses the wearable electronic device to act as a coordinator, reconfigurator or aggregator for various devices within a larger system in order to form an end-to-end approach to track and trace contacts, document outbreaks and manage cases, as well as to inform employers, visitors and staff (such as those associated with hospitals, senior living facilities or related businesses that provide health care and related services) for of a potential exposure. In another context, the PAN may be employed for other forms of socialization and measuring that operate in a manner analogous to contact tracing, such as for people-to-people, as well as for workplace scenarios such as people-to-staff or people-to-boss. Details associated with a comprehensive embodiment of such wearable electronic device and its associated LPWAN may be found in US Published Application 2019/0209022 entitled WEARABLE ELECTRONIC DEVICE AND SYSTEM FOR TRACKING LOCATION AND IDENTIFYING CHANGES IN SALIENT INDICATORS OF PATIENT HEALTH that corresponds to pending U.S. patent application Ser. No. 16/233,462 that was filed on Dec. 27, 2018, is owned by the Assignee of the present disclosure and the entirety of which is incorporated herein by reference. In one form, the PAN and methods disclosed herein include some or all of the components and associated functionality associated with the wearable electronic device that is disclosed in US Published Application 2019/0209022.

In one form, the LPWAN is based on a LoRa chipset with its chirp spread-spectrum radio-frequency (RF) signal generation such that the devices and systems disclosed herein may utilize compatible stack protocols such as LoRaWAN (which is IEEE 802.15.4g-compliant) as a way to establish a PAN-to-IP network communication channel. More particularly, when viewed within the context of an IP suite conceptual model in general and the transmission control protocol (TCP) and the IP in particular, the LoRa chipset defines the physical layer (PHY) while LoRaWAN defines the Media Access Control (MAC) layer (as well as the network layer and other layers) to define the basic architecture for a full-stack protocol for use as the intermediary between the wearable electronic device and the end-use IP-based network. In this way, the PAN can leverage inexpensive sensors, beacons and associated components that are situated in nearby data-acquisition devices that are within the communication range of the PAN in order to aggregate the information contained within these other devices, yet take advantage of only requiring the single master (that is to say, source node) device to perform the downstream communication functions. In one form, nearby sensors that are on other devices that are within communication range of the PAN, as well as on-body sensors of the wearer, could send data to the master device for subsequent conveyance via LPWAN to the larger network. In this way, the PAN as disclosed herein may be used in conjunction with an individual or group of individuals to communicate and exchange data that in turn may be analyzed for determination of one or more characteristics of the person or people associated with the wearable device or devices.

By using a LoRa-based approach to communicating acquired data between the PAN and a wirelessly remote end-use application as disclosed herein, the authors of the present disclosure have found that certain expenses and infrastructural complexities associated with conventional high-bandwidth cellular-based approaches, including those that may use one or more of the LTE, GSM, code division multiple access (CDMA), time division multiple access (TDMA), Universal Mobile Telecommunications System (UMTS), General Packet Radio Service (GPRS), Voice over IP (VoIP) or the like, may be reduced or eliminated.

According to a first aspect of the present disclosure, a PAN that uses a wearable electronic device as a source node is disclosed. The wearable electronic device includes a wireless communication module configured to receive at least one incoming signal from a remote device, a non-transitory computer readable medium, a processor electrically coupled to the non-transitory computer readable medium and a set of machine codes stored in the non-transitory computer-readable medium and operated upon by the processor. The set of machine codes includes a machine code to cause the wireless communication module to receive from a mobile beacon of a one or more peripheral nodes that are within range of the PAN at least device identifier information that uniquely identifies the mobile beacon and associated peripheral node, and event data associated with the peripheral node. The set of machine codes also includes a machine code to cause the wireless communication module to transmit the received event data using an LPWAN protocol. In one form, the PAN is used for one or more of testing, contact tracing, proximity monitoring and geofencing.

According to a second aspect of the present disclosure, a wearable electronic device is disclosed. In one form, the wearable electronic device is used for one or more of testing, contact tracing, proximity monitoring and geofencing.

According to a third aspect of the present disclosure, a non-transitory computer readable medium that has executable machine code that upon execution on a machine causes the machine to operate a PAN. In one form, the resulting PAN is used for one or more of testing, contact tracing, proximity monitoring and geofencing.

According to a fourth aspect of the present disclosure, a method of monitoring an individual with a wearable electronic device is disclosed. In one form, the method is used for one or more of testing, contact tracing, proximity monitoring and geofencing.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 8 depicts a contact report shown by a notional display and that is used with the PAN disclosed;

Figure 1:
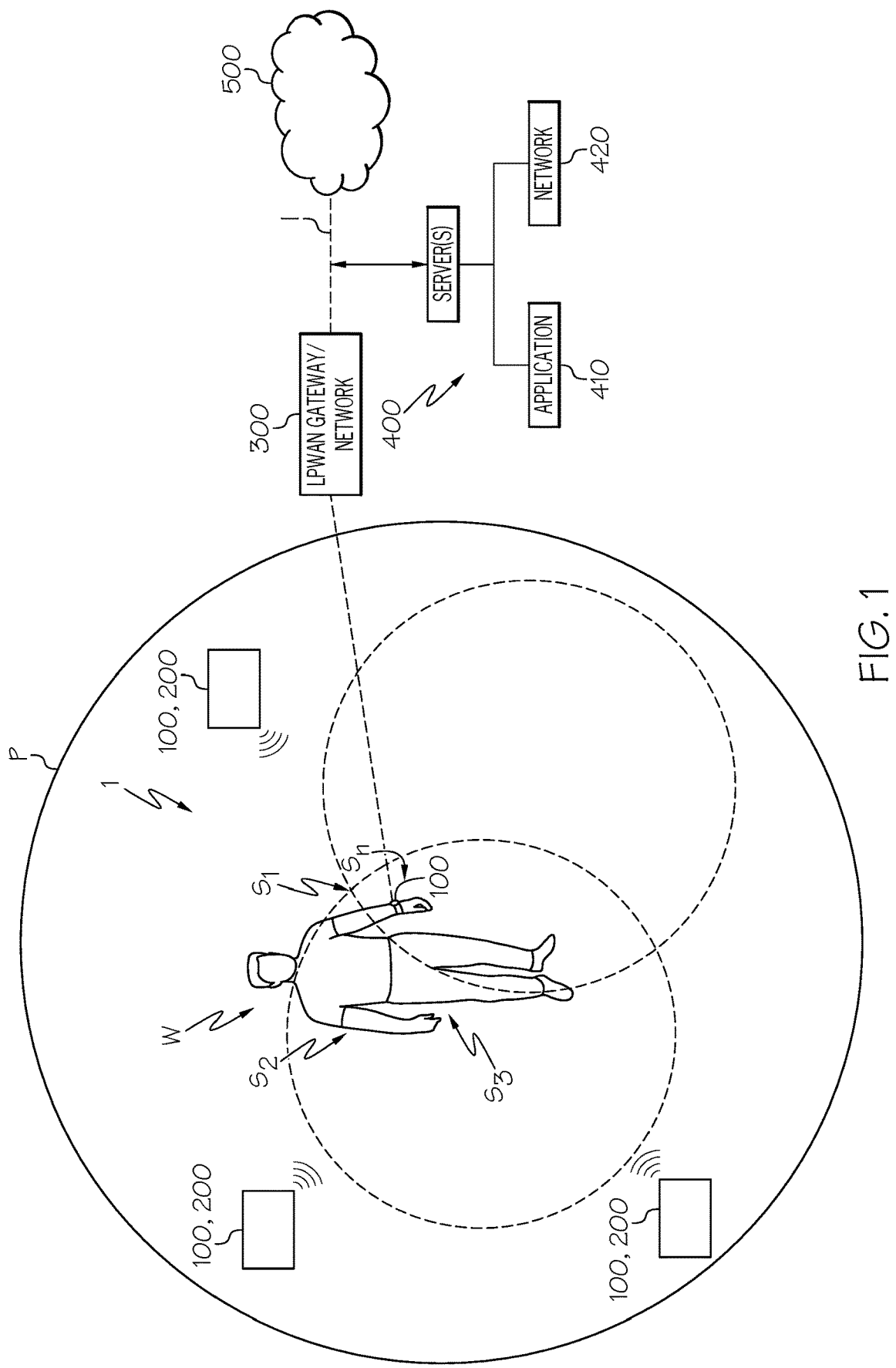
FIG. 1 depicts a simplified view of wireless signal connectivity between a wearable electronic device that forms a PAN and the internet through an LPWAN gateway or network, as well as how the PAN may be used to form a geofence, all according to one or more embodiments shown or described herein.

It will be appreciated that for the sake of clarity, elements depicted in the drawings are not necessarily to scale, and that certain elements may be omitted from some of the drawings. It will further be appreciated that certain reference numerals may be repeated in different figures to indicate corresponding or analogous elements.

DETAILED DESCRIPTION

Figure 2:
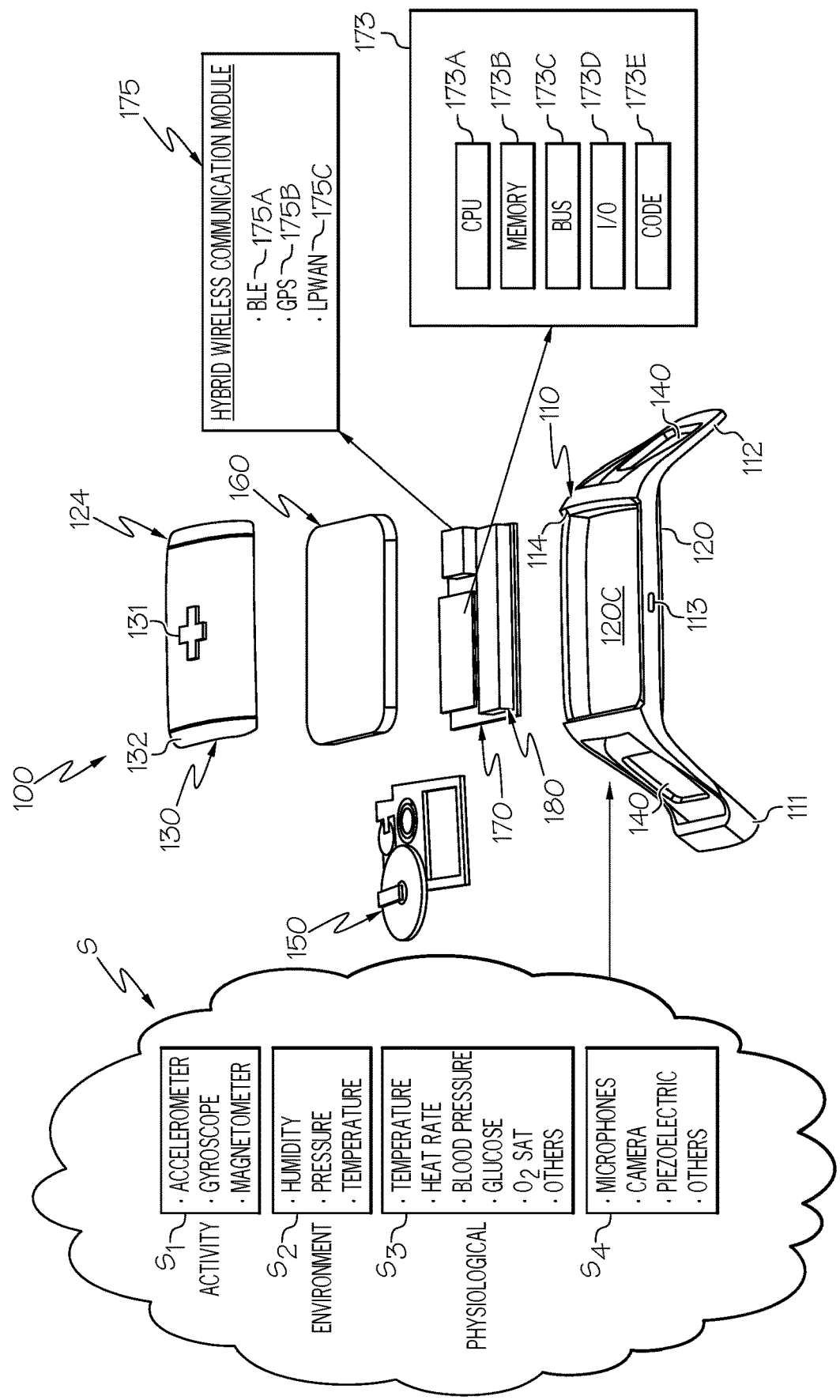
FIG. 2 depicts an exploded upper perspective view of the wearable electronic device of FIG. 1, as well as a block diagrammatic representation of its logic device, various sensors and hybrid wireless communication module.

The disclosed devices, systems and methods allow for real-time tracking through a PAN to provide data-informed insights of people and activities that are within communication range of the PAN. While much of the present disclosure emphasizes the wearable electronic device, PAN and peripheral components and systems for use in providing information pertaining to the potential or actual spread of a virus or related disease that if left unchecked could to cause an epidemic, pandemic or the like, it will be appreciated that such devices, components and systems may be used for other applications as well, such as for acquiring other forms of location, environmental, activity, physiological (LEAP) or other data associated with the individual to whom the wearable electronic device is attached. For example, accelerometer data may be grouped as activity data, while heart rates, blood oxygenation, cardiac, temperature, incontinence (such as through diaper moisture sensing) may be grouped as physiological data, temperature, humidity and barometric pressure may be grouped as environmental data; all of these are directly-measurable forms of data. It will be appreciated that other types of data may be derived, such as through analysis or computation, including that arising out of conducting machine learning analyses such as those discussed herein; one example of such derived data may include activities of daily living (ADL) data that in one form is correlated to accelerometer data through machine learning. Likewise, some data may have both direct and derived attributes, such as location data that may be both relative and absolute via radio signal strength indication (RSSI) variables derived therefrom. It will be appreciated that these and other forms of data (such as depicted in FIG. 2) may be subjected to additional analysis in order to perform one or more of the contact tracing, proximity monitoring, geofencing or related activities disclosed herein. The PAN disclosed herein refers to the interconnection of peripheral information technology devices, sensors, beacons or the like (individually or collectively referred to as peripheral nodes) that are within the environment of an individual user that is associated with the wearable electronic device (also referred to as a source node). In one non-limiting form, such peripheral nodes are within about ten meters of the source node.

The prevention of communicable disease spread may be enhanced through a combination of functions that are within the capability of the PAN. Such functions include—among others—testing, contact tracing, proximity monitoring and geofencing. While clinical-based testing of an individual is beyond the scope of the present disclosure, the authors herein have additionally determined that the acquisition of various types of sensed data by the wearable electronic device—in conjunction with on-device real-time analysis based on such data—can accurately predict whether the individual being monitored by such device has a high likelihood of contracting the communicable disease. This in turn can lead to the device, PAN and system to perform additional activities relating to one or more of location tracking, contact tracing, proximity monitoring and hotspot detection, as well as corresponding informing functions of such likelihood through dashboards, reports, messages or the like that can be conveyed to caregiver, employees, family, friends, public health policy organizations or the like on a mobile device, computer screen or the like. In one form, the inclusion of one or more beacons (such as in a hospital, retirement community, assisted living community or related healthcare facility) may be used to promote additional location tracking; this latter form is particularly useful for hotspot detection; that is, to know within a building where the sites are where the most contact between people has been occurring. Once these hotpots (such as bathrooms, or break rooms, random hallways or the like) and their corresponding levels of increased risk are identified, the resulting information can be of use for planning, risk avoidance or related measures.

In one form, the contact tracing may include logging interaction details of the individual being monitored, including details associated with elapsed time, distance, device identifiers or the like. In this way, and using validated exposure notification protocols, suitable interaction recording and associated notifications may be made by one or more of the devices, PAN and system. In one form, geofencing or related zone monitoring may include sending or receiving notifications when the individual being monitored enters or exits a designated, geofenced area. In one form, proximity monitoring may include sending or receiving device alerts (such as through audible, visual or haptic means) when the wearable electronic device is within a preset distance (for example, six feet, per current Centers for Disease Control (CDC) guidelines) of another such device. In one form, when two wearable electronic devices such as those disclosed herein experience an interaction where they come within such preset distance, the devices are configured to exchange data (such as through anonymized tokens or the like), where such data may include the duration of the interaction and the date and time of the interaction. This information is then sent to a remote location (such as a secure cloud-based location) where it can be retrieved in the event that a disease outbreak has been detected. As mentioned elsewhere, device and system-based operations associated with these activities are in one form automated.

In one form, the proximity monitoring may include the detection of other devices in order to ensure that minimum distances are being maintained, as well as providing visual, haptic, audio or related alerts, warnings or the like when such minimums have been breached to serve as a reminder to adhere to social distancing guidelines. In one form, machine learning (including on-device machine learning) may be used to help with such proximity monitoring. As previously mentioned, information gleaned from proximity monitoring may be thought of as a subset of location information; however, it does not necessarily mean that proximity monitoring is the same as location tracking. For example, in situations where increased security or user privacy may be important to the users of other devices within the PAN, if the beacons or other sources of RF signals being transmitted from such other devices do not include GNSS, their own static geofences or other sources of absolute (or quasi-absolute) frame of reference locationing, then the proximity information acquired by the central device within the PAN becomes more anonymized, due at least in part to its ever-changing (that is to say, dynamic) nature.

In one form, hotspot detection may include having the wearable electronic device cooperate with adjacent (that is to say, those within wireless signal communication range) beacons to gain a more accurate representation of indoor location and interpersonal interaction. In one form, the identity of the people making such interactions may be anonymized, while still allowing a system administrator (such as those associated with a nursing home, assisted living community, group home or the like) the ability to monitor the interactions and adjust protocols accordingly.

In one form, a dashboard or other display-based approach may be used to provide various organization management functions. For example, when the organization is a place of employment, place of public accommodation, healthcare facility or other entity where groups of people can be expected to congregate, the dashboard may be made to provide notification functions, as well as the results of analytic-based assessments (such as those from one or more machine learning algorithms as is discussed in more detail herein), as a way to view organization-wide risks, create and track infection cases, send automatic messages (such as short message system (SMS), push or voice notifications), as well as—in the case of a healthcare facility—to manage staff, residents and visitors. In configurations where machine learning is being used to analyze data collected by the wearable electronic device and its associated PAN, one form involves using the machine learning model to evaluate a health condition of an individual being monitored. In a more particular form, such evaluation is taking place at the edge (that is to say, on the device). Likewise, regardless of whether such machine learning takes place at the edge (that is to say, on the wearable electronic device) or in an remote computer, server or other platform or system, the analysis or inference produced therefrom may be made analyzing the health condition of an individual being monitored, perform contact tracing on infected persons, perform proximity monitoring or other related functions. In another form, other uses beside health condition evaluation may be performed by the device, PAN and system disclosed herein. For example, sensing and associated analysis, reporting or the like may be used to help evaluate an environmental issue around the person being monitored, such as in an industrial or related setting where high levels of a gas or dangerous chemical may be present. It is understood that all such uses and scenarios are within the scope of the present disclosure.

In one form, a notional display such as a mobile phone screen, tablet screen, computer screen or the like may be used to present notification, warnings or the like. For example, an API loaded onto the mobile phone of an employee of a healthcare facility may provide summary information, testing recommendations or the like in order to give employees access to risk levels based on sensed interactions. In addition, an analysis of historical or past interactions may be presented, as can a list of resource such as local healthcare providers, testing center locations and hours of operation. In addition, it allows the person to manage his or her bubble. Within the present disclosure, such a bubble may be a user interface or related component on an a mobile or website-based application programming interface (API) that allows the individual to see the number of interactions and risk level of a group of other people (such as friends, family, co-workers or the like) with which the individual may have frequent encounters. In one form, the bubble also can serve as a safegroup whereby the people in that bubble are known contacts and may categorized differently that other people (such as a random stranger) that is outside such group. One form of different categorization may include not counting the people in the group in the same way for contact tracing purposes, while another form may include assigning a different risk level or priority level to people in the group than outside the group owing to known behavior or interaction patterns. In a related way, this may allow the selective disabling of certain functions (such as social distancing alerts) of the device for people in the bubble when they are near each other.

Referring first to FIG. 1, a system 1 is shown in the form of a network-based or network-accessible computing platform configured to perform various data acquisition activities associated with the operation of a PAN P. In one form, system 1 may be referred to as a network-capable computing platform to perform software as a service (SaaS), cloud services, on-demand computing, platform computing, data center computing or the like. A wearable electronic device (also referred to herein as a source node) 100 is used as a central part of the PAN P and may be affixed to a wearer W so that data related to one or more of the wearer W location, environment, activity and physiological (LEAP) attributes may be collected by sensors $S_1, S_2, S_3 \ldots S_n$ or other devices (collectively referred to as peripheral nodes) 200 in order to be wirelessly conveyed to the internet I through at least one LPWAN gateway 300 (also referred to herein as gateway 300, only one of which is shown) and then to the cloud 500. In one form, the internet I may include—among other things—various servers 400 that in turn may be made up of various network servers 410, application servers 420 or the like, all of which are understood by those skilled in the art as being useful in order to establish backhaul connectivity throughout the internet I. In one form, the network server 410 may perform various transmission functions, such as—among other things—acknowledgement of a transmission, selection of which of several gateways 300 is to be used for sending any necessary downlink transmissions to the wearable electronic device 100 or gateway 300, as well as for eliminating duplicate receptions. In one form, the network server 410 may receive uplink transmissions from multiple gateways 300, but might only send downlink transmissions to a single one of such gateways 300. Likewise, application server 420 may function as a computing nerve center for system 1 to run protocols and interfaces, such as web-based APIs or the like in order to perform LoRa-based message handling and archiving, end user identification, notification-sending rules, security and software or firmware upgrades, among other functions. Within the present context, the servers 400, internet I and cloud 500 may form the backhaul that, depending on the configuration, may be situated at one of numerous geographic locations, including a geographically remote location with respect to PAN P, and that all such variants are deemed to be within the scope of the present disclosure. In one form, server 400 may include built-in redundancy features. For example, communication between the wearable electronic device 100 and the gateway 300 may be configured such that up to six different LoRaWAN network credentials may be stored. This in turn permits hopping between credentials to take place seamlessly such that network 300 or server 400 isn't available (such as through a loss in connectivity), the data acquired through the PAN P and transmitted by the wearable electronic device 100 is still conveyed to its end use destination. Such functionality may also work in situations when a private network between the various components is being employed (such as for a nursing home, hospital, assisted living facility or the like) and there becomes a need to switch to a public network (such as that provided by internet service providers (ISPs) for example).

The use of LoRa-based chipsets, coupled with various protocols and system architectures such as those associated with a wireless telecommunication protocol such as LoRaWAN, allows long-range, low-power communication for low-to-medium bandwidth data requirements such as those being delivered from PAN P in general and the wearable electronic device 100 in particular to such backhaul while taking advantage of (in one form) a star network topology (more particularly, a star-of-stars protocol) such that the gateways 300 act as a transparent bridge between one or more wearable electronic devices 100 and the backhaul. Within the present disclosure, in a star-of-stars topology, the various wearable electronic devices 100 are wirelessly coupled to one or more of the gateways 300 via single hop LoRalink, while the gateways 300 are connected (such as through the internet I, for example) to a common network server 400 (such as server 400). In fact, the star-based topology is consistent with the LoRaWAN protocol in that the protocol does not support direct communication between the wearable electronic devices 100. As mentioned elsewhere, such data acquisition—as well as related analysis and wireless transmission of such data—is performed automatically. Within the present disclosure, such automated operation may include having the wearable electronic device 100 join an LPWAN network (such as a Helium Hotspot or related peer-to-peer wireless network, for example) that encompasses one or more of the gateways 300, forwarding the data that was received by the gateway 300 to the internet-based servers 400 such that the network server 410 will forward the data to a backend (such as AWS IoT Core, for example) for one or more of recordation, processing, analysis or the like, and enable frontend APIs to retrieve the recorded, processed, analyzed data such that a localized report of contact tracing data may be presented to the individual associated with the wearable electronic device 100, family members, caregivers, public health and policy centers, government agencies or other interested people or institutions. In one form, the LPWAN network is configured to offer cryptographic proof of the transmission of various data (such as time and location) from the wearable electronic device 100 to the gateway 300; such proof may be in the form of permanent recordation on a distributed ledger such as Blockchain.

In one form, the LPWAN signal used to convey data collected by the wearable electronic device 100 is predominantly used in a one-way flow of such information in an uplink manner to the gateway 300, while in another form, two-way (that is to say, bidirectional) mode of communication that includes downlinks is possible. In this latter mode, information that is generated, processed or otherwise acquired from a remote location such as the backhaul server 400, cloud 500 or the like may be returned to the PAN P through the wearable electronic device 100 in its capacity as the master device within the PAN P. Also in this latter mode, and consistent with any of Classes A (ALOHA-style), B (with time-synchronized, scheduled receiving slots to promote additional downlink capacity and lower latency) or C (where downlink and associated wearable electronic device 100 ability to receive transmissions is on substantially all of the time) communication, some form of downlink may also be employed in order to establish security updates, data transmission (i.e., received packet) acknowledgement, other over-the-air (OTA) updates, activations or the like. Significantly, this provides the opportunity for the wearable electronic device 100 to change its class dynamically depending on the level of data being shared via the PAN P. For example, if more data is required in a particular downlink, the wearable electronic device 100 could switch to a Class C device for more frequent or more bidirectional modes of communication, after which it can then switch back to a Class A or Class B mode after either completion of the transmission, a set amount of time specified or by default. Furthermore, the use of downlink capability is such that a downlinked inquiry can be made of the wearable electronic device 100 to have it in turn inquire of the devices in the PAN P for data, as well as to give it instructions about what data is to be received at the backend. Considerations for choice of class may be based on various operational considerations such as power usage (which corresponds to battery life), duty cycle and latency requirements, message content and broadcasting status (that is to say, unicast versus multicast), situation exigency, threshold-exceeding movement, communication-initiation source or the like. Moreover in such downlink communication, an application server 420 that is part of the backhaul server 400 may communicate with a network server 410 that is also part of the backhaul server 400 and that in turn sends each downlink message to a single gateway 300 that then transmits the message to the wearable electronic device 100. Furthermore in this latter mode, the gateway 300 may act as a duplicating, packet-forwarding device by first receiving LPWAN radio signals from events recorded and stored in the wearable electronic device 100 and then forwarding them to the backhaul server 400. In this mode of operation, the wearable electronic device 100 is capable of encrypting and decrypting packets, as well as be observant of duty cycles and perform network authentication functions.

As previously discussed, in one form where the signal transmission protocol is based on LoRaWAN, various functionalities are enabled, including the ability of a large number of the wearable electronic devices 100 to be monitored simultaneously, the ability to engage in adaptive data rate (ADR) transmission (which can reduce the need for signal-hopping), the ability to have bidirectional end-to-end communication, OTA software or firmware upgrades, range-versus-message duration tradeoffs, more accurate localization and the ability to roam between gateways 300 without a disruption in connectivity in a manner that substantially mimics the movement of a mobile telephone between cell towers. Furthermore, communication between the wearable electronic device 100 and the gateway 300 may be configured such that up to six different LoRaWAN network credentials may be stored to allow seamless (that is to say, automatically and without a substantial break in connectivity) hopping between credentials, as well as public-private network switching, depending on the circumstance or need. When multiple credentials are used, they may be further set up to prioritize a particular order, such as first, second, third and so on. In one form, each gateway 300 can serve numerous (for example, in excess of a thousand or more) wearable electronic devices 100. Having multiple gateways 300 may be helpful in establishing a star topology for a network formed between such gateways 300 and the PAN P through one or more of the wearable electronic devices 100. By having this bidirectional capability, the wearable electronic device 100 and associated PAN P can—in addition to operating in a passive mode for monitoring location, activity, behavior or the like—operate in an interactive way with other components within the system 1 or other devices within a particular environment, including within the PAN P itself.

In this latter form, the bidirectional exchange of information within the PAN P between the wearable electronic device 100 as the source node and the remaining peripheral nodes 200 (whether in the form of beacons, other wearable electronic devices 100, sensors $S_1$, $S_2$, $S_3$ . . . $S_n$ or the like and all of which are in signal communication with the source node) may be used to conduct handshaking between them. Such handshaking, as well as the repeated bidirectional communication between source and peripheral nodes 100, 200 within the PAN P, ensures that a substantial entirety of the data being transmitted back and forth actually reaches its intended destination. For example, by including a checksum or related algorithmic function, potential errors in the transmission of the data may be readily identified and corrected. Thus, in situations where integrity of the data is required or otherwise important, data acquired by and contained by the peripheral node or nodes 200 may only be removed from its internal queue of data once the peripheral node has been assured from the source node 100 that the data has been correctly received and processed. Such assurance may use checksum or other suitable algorithms in responses from the source node 100 to the peripheral node 200 after data transmission. By way of example when the intra-PAN P wireless transmission is using a BLE-based protocol, BLE indications from the peripheral node 200 (as a BLE server) are made to the source node 100 as a BLE client as a way to establish suitable acknowledgment rather than mere notification; this in turn results in confirmed data transmissions. The use of a cyclic redundancy check (CRC) and parity check may further help to ensure transmitted data validity, while the assurance of specific types of data may similarly be undertaken in the form of a data assurance transmission method, algorithm or the like.

Within the present disclosure where health, medical and related disease-spread information may be transmitted both within the PAN P and between the PAN P and gateway 300, servers 400, cloud 500 or other outside systems, networks or the like through the bidirectional wireless signal communications discussed herein, data validity measures such as these are particularly beneficial. As discussed elsewhere, the use of bidirectional intra-PAN P communication may further help with power management functions. For example, active transmission of data from the peripheral node 200 to the source node 100 is initiated by the source node and can be made to only occur when the source node 100 can reasonably assume that transmission is needed and that the transmission will succeed based on its internal state, measured values of its environment and the peripheral node 200. In other words, the source node 100 will not connect to download data from the peripheral node 200 unless it detects a sufficient signal strength from the peripheral node 200, and for a sufficient amount of time. This in turn may include the use of machine code to prioritize certain kinds of peripheral nodes 200, as well as prioritizing based on how much data the source node 100 can detect has been backlogged by the peripheral node 200. This has the effect of minimizing wasted dataflow traffic and the concomitant unnecessary usage of battery power by both source and peripheral nodes 100, 200.

This relatively high degree of interactive (rather than merely passive) involvement enabled by bidirectional communication that is used to ensure validity of the data being transferred in turn allows for the formation of a self-configuration network (or a self-organizing network (SON)) such that the PAN P may manage itself. By way of example, machine code that is discussed in more detail herein may cause the PAN P to perform at least one of configuration, registration and calibration. This in turn enables various updates to the same, including those to software or firmware, including to the peripheral node or nodes 200. Non-limiting examples of configuration updates may include those for the selective engagement or disengagement of certain functions (such as a panic button on the wearable electronic device 100), LPWAN power level changes, such as to get extended distance or range versus extended battery life and changing request and response status between the source and peripheral nodes 100, 200 to acquire certain forms of LEAP data, among others. In this last example, by assuring bidirectional communication between the source and peripheral nodes 100, 200, the PAN P enables requests for a particular peripheral device 200 to acquire a measurement, such as an electrocardiogram (EKG) reading or the like. Such targeted (rather than indiscriminate) requesting is especially beneficial for measurements that are taken at peripheral devices 200 that consume larger amounts of power during the measurements but low power during idle as a way to conserve battery power. In another use for self-administered configuration changes, restrictions may be made on the number or type of possible networks that can join the PAN P; this has the effect of conserving power on the various peripheral devices 200. In addition, further measures may be undertaken to ensure proper data transmission within the PAN P. For example, data transmission from the peripheral node (or nodes) 200 to the source node 100 is only allowed to occur when the signal strength threshold between them is great enough to ensure complete transmission and when the data to be transmitted can be assured to be completed in full (such as through checksum or other suitable algorithms). It will be appreciated that these are but a few examples of how the bidirectional communication between the source node of the wearable electronic device 100 and the peripheral nodes 200 promotes a SON.

Within the present disclosure, registration could be achieved by placing the wearable electronic device 100 in close proximity with a measurable parameter of interest (such as a heartbeat being sensed by a heart rate monitor) for a short period of time (for example, around five seconds) in situations where near-field communication (NFC) or related wireless communication is enabled. Registration could also be conducted through a registration process, through an exchange of keys back and forth or through a BLE connection that accepts the two devices as a part of the PAN P of the source node 100. Likewise, calibration could be applicable to numerous features. In one form, the source node 100 may be used to calibrate or configure one or more of the peripheral nodes 200. Using the previously-discussed detection of heart rate as an example, calibration of the heart rate monitor may take place such that it monitors for a duration (for example two hours) at predetermined rate (for example, every one minute) after which it reverts back to its default monitoring rate. Self-calibration is also possible in that in a situation where a sensor or related device may have to adjust to a new, updated standard, it can reset, balance out and then confirm that it was calibrated to the new standard, as well as send a status update upon completion. In a similar manner, the bidirectional nature of the communication between the source and peripheral nodes 100, 200 may be used to conduct diagnostic tests, system information or related status updates for the various components that make up the PAN P, such as when such diagnostics, tests or status information is transmitted to the source node 100 from the one or more peripheral nodes 200. For example, an error code or an update (such as an update on the number of battery charge cycles or an indication that it is time for some predictive or preventative maintenance of a particular device) may be transmitted in order to allow machine code (such as that resident on the wearable electronic device 100) to conduct an analysis, prepare a report or the like.

Furthermore, data compression may take place on the wearable electronic device 100 before sending such data to the gateway 400 and backhaul. As discussed elsewhere within the present disclosure in conjunction with a machine learning workflow 1000, one form of such data compression may be in the form of data cleaning in general, with a more particular form being dimensionality reduction. As a corollary, native intelligence on the wearable electronic device 100 helps to promote some measure of self-backhauling, which is beneficial in situations where access to the backhaul server 400 is not available. Moreover, such bidirectional capability may help with registration of the various devices, such as through short range RFID, BLE or NFC connectivity. In one form, the registration may be event-based.

In one form, the sensors $S_1, S_2, S_3 \ldots S_n$ may be distributed over various places on or adjacent the wearer W such that they are physically distinct components that are separate from the wearable electronic device 100, while in another, the sensors $S_1, S_2, S_3 \ldots S_n$ may be contained within the wearable electronic device 100, while in still another, some of the sensors $S_1, S_2, S_3 \ldots S_n$ may be separate components while others are part of the wearable electronic device 100. In yet another form, one or more of the sensors $S_1, S_2, S_3 \ldots S_n$ may form autonomous or semi-autonomous data-collecting devices. Within the present disclosure, a sensor detects events or changes within the environment in which it is placed, and may record, indicate, forward or otherwise respond to a particular physical property that is being measured. Depending on the configuration, and as will be discussed in more detail as follows, in one form, communication between the various sensors $S_1, S_2, S_3 \ldots S_n$ and the wearable electronic device 100 may be thought of as an intra-PAN construction, while in another as an inter-PAN construction where the former is that which takes place within the PAN P while the latter is that which takes place outside of the PAN P. It will be appreciated that both variants are deemed to be within the scope of the present disclosure. By way of example, in one form, an inter-PAN communication may be formed between the wearable electronic device 100 and sensors $S_1, S_2, S_3 \ldots S_n$ and other devices external to the PAN P, while in another form, a substantial majority or entirety of the acquired data may be conveyed to the wearable electronic device 100 from devices that form part of the PAN P. Moreover, in configurations where one or more of the various sensors $S_1, S_2, S_3 \ldots S_n$ are physically distinct components that are separate from the wearable electronic device 100, they may be made to establish signal communication with the wearable electronic device 100 through one or more short-range or very short-range radio signals using a suitable NFC, or in the alternative through one or more short-range protocols or wireless interfaces such as Bluetooth, WiFi, Zigbee, BLE, 6LoWPAN, IrDa, RFID or the like.

In one form, the sensors $S_1, S_2, S_3 \ldots S_n$ form so-called "smart devices" in that they are made IoT-compatible through suitable RF connection such that data that they acquire may be conveyed based on certain triggering criteria. In one form, the acquired data may be conveyed based on triggering criteria established by logic contained within the sensors $S_1, S_2, S_3 \ldots S_n$ or wearable electronic device 100, while in another form via logic contained within the gateway 300, servers 400 or cloud 500. In one form, such triggering may involve the transmission of previous measurements that may have been acquired by—and locally stored upon memory contained within—one or more of the sensors $S_1, S_2, S_3 \ldots S_n$. Regardless of where such logic is situated, it will be appreciated it may exist in a known form, such as through a software development kit (SDK) or the like, and that in addition to performing various calculations and event-triggering or event-responding activities, may also detect and interpret wireless and related radio broadcasts that take place between the various components that make up PAN P.

Examples of how various triggering events may be used to initiate action by the wearable electronic device 100 include text, call or e-mails from outside sources, as well as certain threshold-exceeding or time-based events. Within the present disclosure, events are those situations, conditions, locations or related measurable quantities that may have an impact on contact tracing, proximity monitoring, geofencing or related functionality associated with the wearable electronic device 100, system 1 or PAN P. These events and triggers may take place regardless of whether the wearer W is being monitored for location, health and related physiological data, contact tracing, ambient environment conditions, activity or purposes as may be discussed herein. As shown in exemplary form, example, sensors $S_1, S_2, S_3 \ldots S_n$ may include chemical sensors, radiation sensors, accelerometers (such as to detect vibrations, falls, extreme movements or the like), cathodic protection sensors (such as for pipelines or other remote or hard-to-reach locations where the use of a LoRaWAN-based approach would be particularly beneficial), various physiological sensors (including temperature sensors that may include infrared (IR) or related thermal imaging functionality) and others that may be signally coupled to the servers 400 through a public or private LoRa-based network that establishes wireless communication between the wearable electronic device 100 and the gateway 300.

In one form, the sensors $S_1, S_2, S_3 \ldots S_n$ can receive communication from the LPWAN through the gateway 300, but can only send information to the LPWAN through the wearable electronic device 100. In this way, the common device credentials associated with each of these and other components within PAN P gives the appearance to the LPWAN that the PAN P is a single device. In another form, the sensors $S_1, S_2, S_3 \ldots S_n$ may possess some measure of both send and receive communication with the LPWAN through the wearable electronic device 100. By way of example for this latter configuration, the wearable electronic device 100 may send out a signal to wake up a first sensor $S_1$ in order to initiate a task such as to first clear a memory (not shown) in sensor 51 and then to have sensor $S_1$ start performing its particular data-acquisition process, such as measuring heart rate, $O_2$ saturation or the like. Additionally, time limits (for example, one minute) may be placed on the length of time for sensor $S_1$ to acquire the data, after which it may then be instructed to transmit the acquired data back to the wearable electronic device 100. In certain operating modes such as the one associated with the form where one or more of the sensors $S_1, S_2, S_3 \ldots S_n$ may possess some measure of both send and receive communication from the LPWAN, certain commands (such as that to clear and retest) need not include having to route such commands through the wearable electronic device 100 for handling other than for the purpose of having it act as the communication gateway. Likewise, in certain operating modes such as the one associated with the form where one or more of the sensors $S_1, S_2, S_3 \ldots S_n$ may possess only send communication capability to the LPWAN, the wearable electronic device 100 may take on a more comprehensive role as the command handler.

In one form, the data generated by the one or more of the sensors $S_1, S_2, S_3 \ldots S_n$ and that is delivered to or otherwise managed by the wearable electronic device 100 may be delivered directly from the wearable electronic device 100 to the cloud 500 through the gateway 300. This obviates the need for intervening infrastructure such satellites (either terrestrial, space-based or nano satellite-based) or a cellular tower, thereby allowing a wireless connection to be established between the PAN P and an end user of the data on the cloud 500 through the internet I without the presence between the wearable electronic device 100 and the cloud 500 of a cell phone, mobile phone, smartphone or the like, while reducing—if not outright eliminating—the need for WiFi. Such a configuration is particularly suitable in situations where analytics, predictions or the like based on such acquired data needs to take place in real-time or near real-time situations such as infectious disease contact tracing, wearer W wandering, health monitoring, location determination or the like. In this way, the insights gleaned from the acquired data may be more quickly put into a form suitable for decision-makers or other interested individuals.

Within the present disclosure, it is understood that the cloud 500 may exist in two forms. First, it may be on the internet I such that it is reached by the gateway 300 through the server 400. Second, it could be locally transferred from the gateway 300 to an intranet or to a specific server (neither of which are shown). Either variant of cloud 500 cooperation with the wearable electronic device 100 and gateway 300 is within the scope of the present disclosure.

Depending on the extent of physical connectivity between the sensors $S_1, S_2, S_3 \ldots S_n$ and the wearable electronic device 100, the latter may be configured to be coupled to the wearer W in various form factors, including wrist-worn (as shown), bandage, article of clothing, or other on-body format, as well as attachable to the wearer W through an external device attached onto a belt clip, in a pocket, on a necklace, on a shoe, helmet, hardhat, safety glasses or the like, in addition to being affixable to a purse, backpack, a subcutaneous implantable (that in one form may be charged like a pacemaker) or the like. Additionally, the wearable electronic device 100 may be configured as a smartwatch, a smartband, smartring or the like, while the sensors $S_1, S_2, S_3 \ldots S_n$ may either on the wearable electronic device 100 or placed somewhere on or adjacent the wearer W, such as through nearby a sensor patch, embedded in or on the clothing, as a subcutaneous implantable sensor (such as a thermometer, insulin detector that—as mentioned previously—can be charged like a pacemaker) or the like. Furthermore, the wearable electronic device 100 and PAN P may be used in various applications, including by way of example and not by limitation: insulin devices, wearable heart rate patches, seizure-monitoring apparati, body-mounted sensors for falls, smart clothing or as an add-on product.

In one form, the wearable electronic device 100 acts as the aggregator or master node of the PAN P, while sensors $S_1, S_2, S_3 \ldots S_n$ or other external devices 200 may act as peripheral data-acquisition nodes, and as such are also referred to herein (depending on the context) as peripheral nodes, peripheral devices, BLC-capable devices, beacons, mobile beacons or the like. In one non-limiting form, the external devices 200 may include personal digital assistants (PDAs), mobile telephones, personal computers (PCs), laptop computers, mobile phones, fitness trackers, headphones, heart rate monitors or other radio-equipped platforms, as well as IoT-based beacons, radio-equipped sensors such as the sensors $S_1, S_2, S_3 \ldots S_n$ all of which may form part of an individual's living or work space. Within the present disclosure, one or more additional wearable electronic devices 100 may also be included among these PAN-compatible devices when they are not acting in their capacity as the source node or master aggregator of PAN P. Within the present context, many if not all of these peripheral devices will include BLE or other short-range protocol modes of transmission. Likewise, many or all of the peripheral device may include locationing functionality through GNSS or related satellite-based inertial frame of reference positioning system sources, as well as relative locationing functionality through triangulation or related cooperation with other similar devices. It will be understood that even in situations where one or more of the sensors $S_1, S_2, S_3 \ldots S_n$ are integral with (that is to say, forms a part of) the wearable electronic device 100, they may still be considered to be peripheral nodes for functional purposes. In acting as the master or aggregator node, the first or primary wearable electronic device 100 manages communication between the sensors $S_1, S_2, S_3 \ldots S_n$ and the LPWAN gateway 300, as well as various management, control and network access and connectivity functions as a way to connect one or more endpoints to a broader network. Within the present disclosure, this aggregator capability allows such wearable electronic device 100 to operate as a full function device (FFD) which—in addition to other functionality—allows it to be configured to have a full infrastructure network access protocol, as well as full control and user plane functionality, including the ability to adaptively change data rates or the like. In this way, application-specific data may be conveyed in MAC frames between various end node devices and the network server 410. Likewise, the MAC frames may be used to transmit control plane data between the end nodes and the network server 410. The structure of the signal and data (that is to say, the payload being carried) may be established within known frameworks within the various headers or control frames as is known in the art. Moreover, various known network-joining strategies and infrastructure may be used within the LPWAN network that includes gateway 300, including—among other things—the use of network address (NwkAddr), application extended unique identifier (AppEUI), device extended unique identifier (DevEUI), application key (AppKey) and the IP address-like device address (DevAddr). To enhance security of the wearable electronic device 100, the AppKey (which is subject to the 128 bit Advanced Encryption Standard, (AES) with public key and private key components), as well as the derived application payload encryption key (AppSKey) and the MAC commands and application payload key (NwkSKey) may receive additional security through their use with—or incorporation into—a secure element. In one form, such a secure element may be thought of as a processor-based physical module with cryptographic code capability to cooperate with a suitably configured API. It will be appreciated that in the use of a secure element, IoT-specific and LPWAN-specific considerations may be made in the design thereof to account for data payload limitations within the communication link. In such circumstance, some form of adaptive cryptographic keys may be used to be responsive to expect future upgrades to IoT devices such as the sensors $S_1 \ldots S_n$ or the peripheral nodes in the form of BLE beacons 200 to ensure additional security of LPWAN IoT communications such as those discussed herein.

In one form, one or more of the various data-acquisition nodes (which in one form may be the same as, or form a part of the peripheral nodes 200) such as those associated with one or more of the sensors $S_1, S_2, S_3 \ldots S_n$, BLE-capable devices 200 or the like may do more than merely passively acquire data. For example, one or more of these nodes may further include active features. Thus, for instance, if the first sensor $S_1$ (which in one form may be an accelerometer, gyroscope or the like) detects that the wearer W has fallen, the sensor $S_1$ in combination with the wearable electronic device 100 may send out a signal to a braking device that is affixed to a walker or related mobility aid (not shown) that is known to be associated with—and currently being used by—the wearer W in order to engage the brakes and stop or reduce additional movement of such mobility aid.

Communication (both one-way and two-way, depending on the need) between the PAN P and the gateway 300, servers 400, internet I or cloud 500, also allows for ease of parameter reconfiguration within the wearable electronic device 100 through suitable files, instructions or related updates from one or more backhaul sources that either form part of or are otherwise connected to the gateway 300, servers 400, internet I or cloud 500. As such, the PAN P may operate in two different link modes: first as a link between it and the LPWAN; and second as a link between the wearable electronic device 100, sensors $S_1, S_2, S_3 \ldots S_n$ (and optionally other components—such as the BLE-capable devices 200 that may be cooperative with the wearable electronic device 100) within the PAN P.

In one form, the wearable electronic device 100 as an FFD may act as an intermediary between two more or more of the sensors $S_1, S_2, S_3 \ldots S_n$ in order to deliver a function without having to backhaul the information to the cloud 500. For example, in such a configuration, the other external devices such as the BLE-capable devices 200 may transmit data to the wearable electronic device 100 which then determines that one or more of the data content, signal strength or other parameter of interest is too low to be of value. This in turn may cause the wearable electronic device 100 to provide some indicia of a potential problem with the acquired data or signal, such as through vibration of a haptic motor, flashing light, audible alarm or the like, as well as possibly communicating back to the BLE-capable device 200 of interest for a similar alert or alarm at the local site of the particular BLE-capable device 200. Relatedly, in situations where the data being offloaded from the sensors $S_1, S_2, S_3 \ldots S_n$ to the wearable electronic device 100 may be present in various forms, including summary data, continuous data or the like, the wearable electronic device 100 may contain configured or pre-set parameters stored in its memory to allow it to determine what type, frequency, size or other attributes of the data to send through the LPWAN gateway 300 and what data to ignore. In addition, these parameters could be adjusted somewhere within other parts of the system 1 (such as the servers 400) as needed based upon current and future desired performance implementations of the wearable electronic device 100. Due to limited resources of—among other things—memory and power, the ability of the wearable electronic device 100 in one form to discriminate between various types of data allows it to allocate resources in an efficient manner to ensure the correct type of data gets transmitted rather than indiscriminately sending all sensed data.

By way of example, predetermined actions may be initiated by the wearable electronic device 100 based on the data acquired from the sensors $S_1, S_2, S_3 \ldots S_n$ or other peripheral devices 200. Furthermore, such acquired data need not be related to the particular functionality of the wearable electronic device 100, PAN P and system 1, such as when they are configured to perform contact tracing or the like. For example, if a detected heart rate of the wearer W is very low, then the wearable electronic device 100 could initiate an action to call emergency services instead of sending data to the cloud 500.

In a similar way, various other data discrimination or filtering protocols may be established within the wearable electronic device 100 and PAN P. For example, in more densely-populated situations, a list of people or maximum number of other devices the wearable electronic device 100 can "listen in" on may be included, such as by a lookup table or the like in the memory of the wearable electronic device 100. This could be configurable based on various needs, including user input, device capacity, mode of operation or the like. Thus, for example, if the wearer W is on a train, it may be undesirable for every nearby BLE-capable device 200 to share data with the wearable electronic device 100. In one form, the wearable electronic device 100 could prioritize other wearable electronic devices 100 or BLE-capable devices that are within the PAN P, as well as on the nature of the information that these other devices carry. In one form, one could adjust the distance the PAN P is around the wearer W, or the number of devices it is monitoring for new data or the people of those devices.

Figure 10:
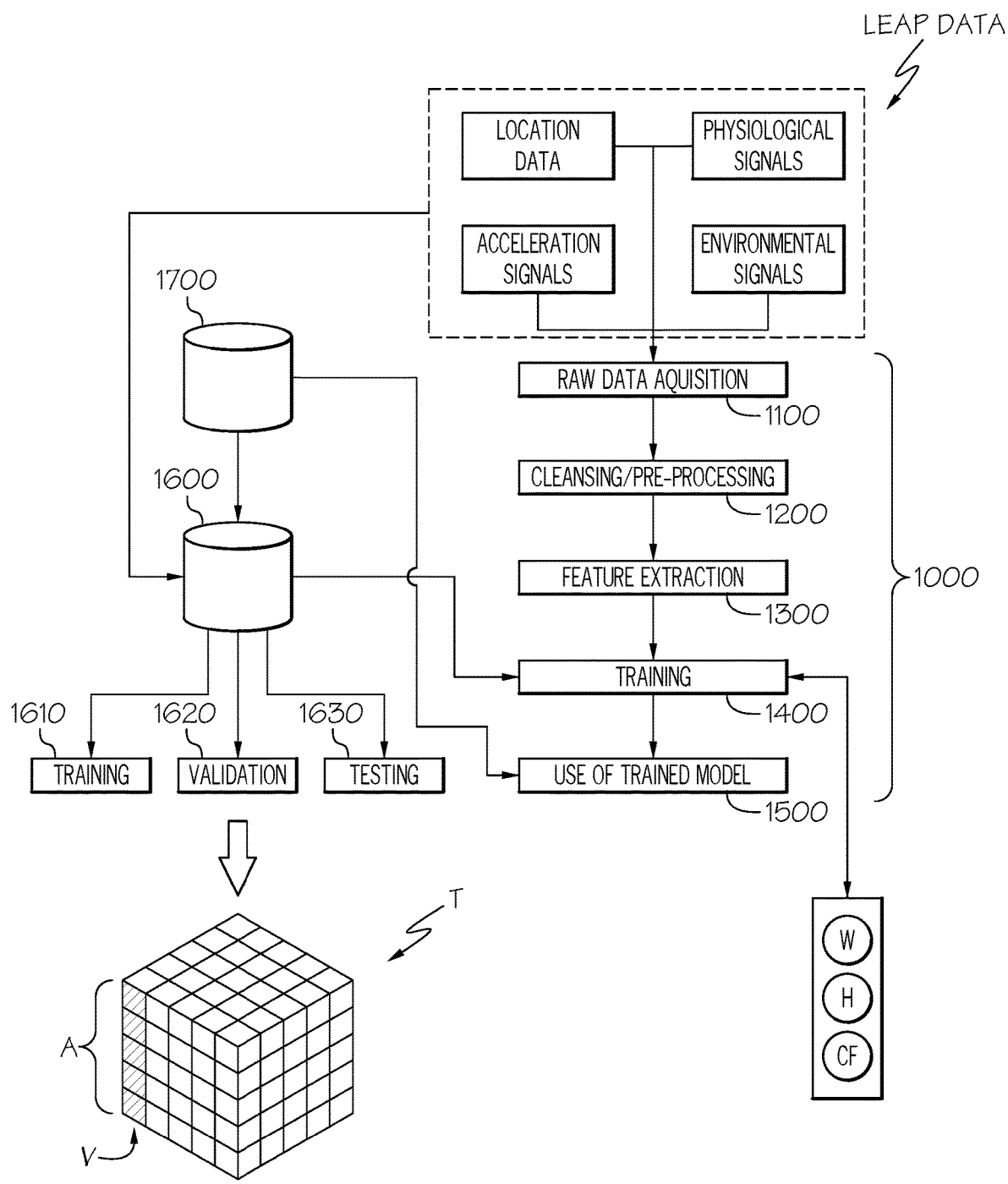
FIG. 10 depicts a program structure in the form of a flow diagram of how the wearable electronic device may be used to develop a machine learning model according to one or more embodiments shown or described herein.

In addition to allowing the wearable electronic device 100 to determine certain data acquisition functions based on need, computational capabilities of the various parts of system 1 may be configured based on data processing needs, including how such computational capacity (including data storage, operation of one or more parts of the machine learning workflow 1000 of FIG. 10, for example) needs may be met either locally at the wearable electronic device 100 or remotely in other parts of the system 1. In a similar manner, the authors of the present disclosure anticipate that such computational and data storage capacity will become significantly greater in the future as their underlying chipsets and peripheral equipment adapt and improve over time, possibly allowing for increasing amounts of computation to take place locally on the wearable electronic device 100. In addition, when coupled to machine learning capability, the wearable electronic device 100 may be tailored to adjust to the behavior of the wearer W, as well as to optimize its operation (including battery power usage) for efficiency during a particular mode of operation.

In one form, the PAN P is configurable to maintain certain preset or other prescribed parameters. For example, in one form, such parameters may include those which are set by an end user such as a physician, caregiver, data analyst, system administrator or the like. Thus, in addition to being used for contact tracing, the PAN P may be used to provide real-time information on maintaining social distancing or the like in order to fulfill at least a portion of its proximity monitoring function. In another form, the PAN P may be configured for resource management, such as the frequency of transmission between the wearable electronic device 100 as the FFD and the larger (IP) network or other backhaul infrastructure, as well as the adjustment of power-consuming functions (which could be initiated either on the wearable electronic device 100 or by a remote user, either automatically or by a system administrator) such as those tied to frequency or immediacy of certain data requirements, as well as for energy use throttling in situations where excessive energy use has been identified. Similarly, the use of on-board memory within the wearable electronic device 100 could be adjusted depending on the needs of the data being acquired, in addition to time-sequencing and prioritization of such data such as a preference to get the most recent data and deleted older data that could not be transmitted with a particular time allotment.

While in one form the topology between the PAN P and backhaul is configured in a star-based configuration, other topologies within the PAN P that may be supported include mesh/peer-to-peer (P2P), cluster trees or the like. As such, at least at the less granular system 1 level, there may be hybrid topology attributes, while at the more granular level, the topologies exhibit their own unique characteristics. In one form, this helps promote how the wearer W of the wearable electronic device 100 may serve as the focal point for communications within PAN P while also allowing such wearer W to serve as a caregiver for patients. By way of example in a hospital, residential care facility or the like, a nurse may have his or her wearable electronic device 100 configured as an FFD in order to monitor numerous patients within the facility who may be wearing their own FFD or RFD devices that are signally operating within the PAN P. Additional details of the wearable electronic device 100 acting as part of a star topology may be found in the previously-discussed US Published Application 2019/0209022, while more details of a mesh-based topology will be discussed herein relating to a geofencing capability of PAN P. Moreover, the wearable electronic device 100 may be configured to have different capabilities, depending on the end use. For example, it can be configured to include one or more of indoor location tracking, outdoor activity tracking, activity monitoring, touch-activated buttons (including, for example, a panic button), wireless charging and advanced sensor fusing (for gesture recognition). One such use depicted by the notional interaction of FIG. 1 between the wearable electronic device 100 and various telecommunication infrastructure is for use for triangulation or related location-determining or communication services.

Referring next to FIG. 2, in one form, the cooperation of the sensors $S_1, S_2, S_3 \ldots S_n$, wearable electronic device 100 and LPWAN gateway 300 form system 1 that is configured for use in tracking the spread of a contagious disease. In a known disease outbreak situation, the location wearer W may have been identified as having been infected with (or at least exposed to) the contagious disease. Likewise, other people who may not be suspected as having been infected may be outfitted with or otherwise have ready access to the one or more BLE-capable devices 200 with which low data content messages may be sent or received. In such capacity, the BLE-capable device or devices 200 form a reduced function device (RFD) that in contrast to the FFD functionality of the wearable electronic device 100 can only transmit to the PAN P (such as to the wearable electronic device 100) rather than both transmit and receive within the PAN P. As such in this form, the RFD that is embodied in the BLE-capable device 200 serves the role of a simple switch or sensor that in one form may emulate the functionality of the one or more of sensors $S_1, S_2, S_3 \ldots S_n$ disclosed herein and that have no routing functionality. In such capacity, the peripheral node or nodes 200 cannot serve as the PAN P coordinator or master in the manner of the wearable electronic device 100.

A logic device 173 includes a processor 173A, executable instructions stored in a non-transitory computer readable medium (such as memory) 173B, bus 173C, input/output 173D and machine code 173E that in one form may reside on memory 173B. Significantly, the machine code 173E is predefined to perform a specific task in that it is taken from a machine language instruction set known as the native instruction set that may be part of a shared library or related non-volatile memory that is specific to the implementation of the processor 173A and its particular Instruction Set Architecture (ISA). In such circumstance, the ISA acts as an interface between the hardware of the processor 173A and the system or application software through the implementation of the machine code 173E that is predefined within the ISA. The machine code 173E imparts structure to the successive architectures of processor 173A, logic device 173, PCB assembly 170 and wearable electronic device 100, specifically in the form of a program structure that may be made up of a set of one or more individual codes. Individual portions of the machine code 173E, such as the machine code to cause a wireless communication module 175 to receive location or event data from a mobile beacon of a peripheral node 200 or the signally cooperative sensors $S_1 \ldots S_n$ and to transmit the received data using an LPWAN protocol form finite, tangible and identifiable structural limitations to the logic device 173, the hybrid wireless communication module 175 and wearable electronic device 100. Within the present disclosure, and absent any specific indication to the contrary, the term "event data" may include one or both of sensor-derived parameters from the sensors $S_1 \ldots S_n$ and location-derived data from various sub-modules 175A, 175B and 175C of the hybrid wireless communication module 175.

The hybrid wireless communication module 175 is made up of at least first, second and third wireless communication sub-modules 175A, 175B and 175 C. The wireless communication module 175 is hybrid in the sense that it employs various forms of wireless signal receiving and transmitting. For example, the signals being transmitted from the beacons 200 as peripheral nodes can be received by a BLE, WiFi, RFID, NFC or related short-range signal-compatible radio that makes up a part of the first wireless communication sub-module 175A, while locationing signals being transmitted by a GNSS or related satellite-based source are received by the radio that makes up a part of the second wireless communication module 175B, and a third wireless communication sub-module 175C includes a radio for outgoing (that is to say, transmitted) LPWAN signals from the wearable electronic device 100 and the gateway 300. It will be appreciated that any combination of two or more of these different wireless communication approaches (as well as their related signal transmission protocols) may be within the scope of such hybrid wireless communication. Together, the logic device 173 and its structural components may cause the third wireless communication sub-module 175C to preferentially transmit the data received by the first wireless communication sub-module 175A when the wearable electronic device 100 is within a predetermined distance from a source of a signal emanating from the corresponding BLE beacon or other peripheral node 200, as well as cause the third wireless communication sub-module 175C to preferentially transmit the data received by the second wireless communication sub-module 175B when the wearable electronic device 100 is beyond the predetermined distance from a source of the BLE beacon 200 signal.

Within the present disclosure, the BLE-capable devices 200 may either form part of a larger system 1 that is based upon the PAN P and wearable electronic device 100, or in another form as an RFD that the PAN P and wearable electronic device 100 have access to and knowledge of its complete configuration. For example, in this latter form, the PAN P and wearable electronic device 100 may have significant identification information of the person assigned to the BLE-capable device 200 that is acting as the RFD. In addition, in situations where one or more of the wearable electronic devices 100 are within communication range with one another, their cooperation could provide indicia of them encountering the same population of BLE-capable devices 200. As such, contact tracing, proximity monitoring and related tracking may be performed on both healthy and already-infected people within a larger population with a greater degree of certainty. In situations such as this, additional security may in one form be achieved through an additional layer of encryption that would apply to devices and components such as the one or more BLE-capable devices 200 or other wearable electronic devices 100 that are within the communication range of PAN P.

In situations where enhanced levels of user privacy may be required (and in addition to the previously-discussed keys), recordkeeping of the sensed data could be achieved through additional anonymizing steps in order to correlate particular device ownership without the use of sensitive personal data (such as social security numbers, residence addresses, personal health data or the like). In one form, the BLE-capable devices 200 communicate a fingerprint or related device-specific data package, indicia or signature, such as the UUID, personal UUID, RSSI-based transmission protocol or the like. In one form, a rotating UUID may be used, where a beacon associated with a particular peripheral node 200 may broadcast an identifier that changes periodically. As long as some form of resolving service is coupled to the beacon to share an encryption key between them, such identifier can be resolved to stable, useful information. In one form, these devices could communicate a fingerprint/signature including UUID, personal UUID, RSSI information or the like as part of a recognition process. In one form, verification of the messages would be sourced through the wearable electronic device 100 and forwarded to the gateway 300 servers 400 and to the cloud 500. In addition, post-processing of the data may occur at various ones of these locations along the way, depending on the intended end-use of such data, computational requirements, time, expense or the like. Thus, in situations where the data may need to be anonymized and where at least a portion of such data is acquired by third-party BLE-capable devices 200, cooperative agreements may be formed by working with the manufacturers of such BLE-capable devices 200 to correlate security, wearer ownership, data anonymity or the like prior to contacting or otherwise notifying authorities of a potential disease outbreak. In this way, these third-parties may be thought of as a list of so-called "trusted vendors", particularly in situations where third-party variants of the BLE-capable devices 200 are not advertising or otherwise broadcasting to the public. Such an arrangement would allow the wearable electronic device 100 and the trusted vendor to communicate freely in the transfer of information that could be helpful in mitigating the spread of a virus or other contagious disease. In one form, such free exchange of information may take place at the cloud 500 where personal information would be transferred using high cyber-security assurance such as that available through known encryption technologies. It would also allow the wearable electronic device 100 to filter the noise of other devices and only focus on the ones of value or that are involved in the system. In another form, the security may be affected at the PAN P level such that encryption may take place between the BLE-capable devices 200 and the wearable electronic device 100 in an autonomous fashion.

Figure 3:
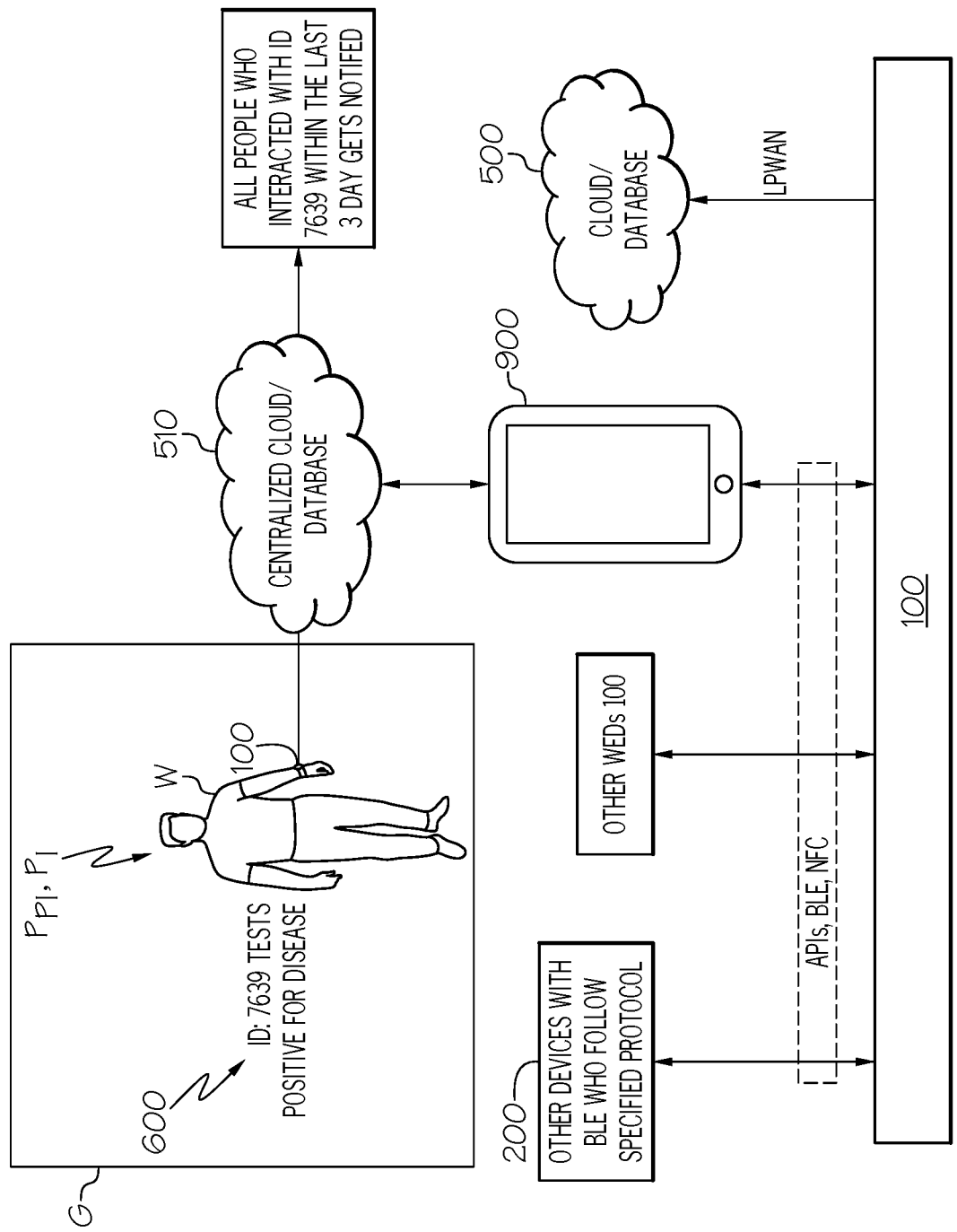
FIG. 3 depicts a simplified view of using the PAN of FIG. 1 to track a wearer that may or may not have been identified as being infected with a contagious disease.

Referring next to FIG. 3, in operation, the wearable electronic device 100 acts as the source (that is to say, primary, central or aggregator) node that dictates the operation of the PAN P can detect the presence of other wearable electronic devices 100 and BLE-capable devices 200 (collectively, the peripheral nodes) that are in the vicinity using BLE beaconing and scanning. Upon receipt of information (such as numerous positive ID tests for a given disease such as COVID-19 or the like), the wearer W may be considered at-risk as a possibly infected person $P_{PI}$ or infected person $P_I$.

In one form of contact tracing, instead of streaming all interaction data to a central database and querying that database when there is a confirmed (or otherwise positive) case and then notifying other people within a given at-risk population, the process may proceed in the reverse in a manner generally similar to computer virus software detection and reporting. As can be seen, the nature of communication between the wearable electronic device 100 and other devices such as mobile phones, other wearable electronic devices 100, BLE-enabled devices such as the BLE-enabled devices 200 that are discussed herein, NFC devices, other devices with suitably-equipped communication protocols and cloud 500 (which in one form may include numerous databases with which to store the acquired data from sensors $S_1, S_2, S_3 \ldots S_n$) is such that these other devices may serve as beacons. The dual direction shown by the arrows indicates that information taken from these other sources could be sent to the other wearable electronic devices 100. Various databases contained within the cloud 500 may include a centralized database 510 and a more specific database 520 that can cooperate with the data that is collected by the sensors $S_1, S_2, S_3 \ldots S_n$) and received through LPWAN from the wearable electronic devices 100, as well as with data taken from other sources as will be discussed next.

Continuing with the computer virus analogy, periodically (for example, every week, every month or the like), the centralized database 510 may be used to store information pertaining to all of the known virus cases, such as through digital signatures 600. Through suitable algorithmic or related analysis, the cloud 500 may in effect scan itself and the centralized database 510 to determine from all of the digital signatures 600 which ones meet a certain criteria, notably those where a particular virus or other infectious disease is confirmed (rather than merely suspected). Based on this analysis, the cloud 500 instructs the centralized database 510 to push a list of the digital signatures 600 of infected persons $P_I$ down to the more specific database 520. In this way, instead of having the centralized database 510 maintain of all of the interaction data of every individual everywhere, the more specific database 520 may be used to contain information pertaining to only the confirmed cases of infected persons $P_I$. Then every so often, display devices 900 (such as the mobile phone shown) will get an update of the list of confirmed cases within a given area (for example, within 10 miles of a GNSS location of the display device 900). Each display device 900 may then store an individual's personal interaction data and compare the confirmed cases with a history of that individual's personal interaction data. If a positive match is identified, an alert may be generated to bring to the attention of the individual associated with the display device 900 the need to get tested. In one form as shown, the display device 900 may also share this information through known telecommunication protocols to the wearable electronic device 100 to alert its wearer W.

In one form, a table of secure history of acquired data from a recent period (for example, from the last 14 days) may be stored in memory on the specific cloud database 520, after which periodic updates of confirmed cases of infection may be transmitted back to the wearable electronic devices 100 for an alert to be generated. In this way, the overall configuration depicted in FIG. 3 allows the system 1 to be adapted for performing contact tracing or proximity monitoring on one or more infected persons $P_I$ using peripheral devices 200 and the two-way communication between them and the wearable electronic device 100.

Thus, in this version as shown, the display devices 900 (as well as their telecommunication equivalents such as watches, tablets, personal digital assistants (PDAs) or the like) act as a beacon broadcasting and transmitting a suitable protocol such as Bluetooth, BLE or other IEEE 802.15.4-compatible modes of communication, particularly those configured for mesh-based interactivity. It is understood that BLE can be within such phone or smart device, thereby allowing such devices to act as the aforementioned beacons in the manner of the peripheral nodes 200. In such circumstance, the wearable electronic device 100 senses the RSSI or related beacon-based signal and converts it to a distance, as well as receives an anonymous token or related UUID to help identify the device from which the transmitted signal is being received. This information (about who the person is, and distance to the wearable electronic device 100, person-to-person or the like) may then be sent to the specific database 520 and then to the centralized database 510. If an individual within the population contracts a certain infectious disease (such as COVID-19 that is spread by the coronavirus), then the centralized database 510 is notified after which a notification may be sent to people who were interacted with during a certain time with the individual within the population that has contracted such disease. In one form, the LPWAN message that is transmitted from the wearable electronic device 100 to the specific database 520 could be to a Bluetooth gateway that then uses a LoRa-based (or LoRa-supported) backhaul, as well as to other backhauls, such as WiFi or cellular, if needed.

By the operation of the system 1 in the manner depicted in FIG. 3, the disease rather than the person is being tracked. In that way, the functionality differs from that of tracking the location of an individual wearer W as discussed elsewhere herein, as well as in US Published Application 2019/0209022.

A geofence G may be formed around the various devices that make up PAN P as a way to provide privacy-enabled virtual location boundary alerts when other devices (including other wearable electronic devices 100 being worn by other individuals) move beyond or within a pre-established range. As shown, the geofence G may define various locations within its boundaries at a particular site, including that of the wearable electronic device 100 as a source node location, a range or distance (such as an RSSI or related straight-line distance) from the wearable electronic device 100, a communication range of the various non-source (that is to say, peripheral) nodes 200 within the PAN P, transmission times for message information, hop limits or the like. In one form, the geofence G may be defined as a static one to surround a physical structure within a given site, such as a building or similar structure. Although the geofence G is notionally shown having a rectangular boundary, it will be appreciated that such shape is non-limiting, and that geofence G may be defined as having any shape, whether geometrical or arbitrary. In another form, the geofence G may be defined as a dynamic geofence G consistent with the mobile nature of the wearable electronic device 100. Thus, unlike a static geofence G, the dynamic version of the geofence G may adapt to changing circumstances, which in turn provide a more accurate representation of other devices coming and going out of the PAN P. Geofence G may acquire location information for the source node wearable electronic device 100 or the non-source/peripheral nodes 200 through absolute or relative frames of reference. For example, an absolute frame of reference includes those available through a global navigation satellite system (GNSS), while a relative frame of reference includes those from localized sources such as RSSI, RFID, multi-beacon triangulation or the like.

In one form, the wearer W need not have been an infected person $P_I$, but instead could be anyone in a community, locality or region of interest. In such a circumstance, the wearer W may be able to track elderly individuals, children, physically or mentally handicapped persons or other people of interest in large, dense crowds such as at sporting events, cultural, religious or civic gatherings, or the like. In these high human density environments, the venue could be populated with multiple gateways 300 using their well-known positions and triangulation methods in order to help monitor the location of an at-risk population or other people of interest. Such a configuration may also be useful in establishing absolute (or near-absolute) location for contact tracing, quarantine monitoring and enforcement or the like in situations where the risk of a contagious disease spread is imminent or identified. In such circumstance, the wearable electronic device 100 could pick up any signals from nearby peripheral devices 200 as the wearer W moves about. In such a scenario, the wearable electronic device 100 acts as a mobile aggregator of BLE signals that it is receiving from these RFID-emulating BLE-capable devices 200, ingesting data and then conveying such data via the LPWAN gateway 300. In one form, the wearable electronic device 100 could ingest data in one of various ways, such as (i) encountering another wearable electronic device 100 that is within communication range, (ii) as a BLE-capable device 200 that in one form may function similar to a nurse call ID beacon, room beacon, elopement beacon or the like and (iii) as another external BLE-capable device 200 with fingerprint/signature capability through RSSI, UUID or the like. In the configurations depicted in both FIGS. 2 and 3, distance or relative location between the wearable electronic device 100 and one or more other wearable electronic devices 100 and peripheral devices 200 may be determined through various algorithmic approaches, such as coordinate transformation computations that use various RSSI, triangulation or trilateration approaches.

If the wearer W has been identified as having a particular condition such as a contagious disease that may require some measure of quarantining, and has in fact been confined to their home, a geofencing (or virtual boundary) capability of the wearable electronic device 100 can be employed in order to provide data (suitably transformed into distance or location) that is useful to an end user. This in turn allows wearers of BLE-capable and related peripheral nodes 200 to be signaled through the PAN P that they may be at heightened risk for infection through proximity to the infected wearer's wearable electronic device 100. Likewise, governmental authorities or other decision-makers may be signaled that other such wearers of the BLE-capable devices 200 may be at risk. In one form, when family members must self-segregate, PAN P could help alert other members of the family that they are getting too close to one another; as mentioned elsewhere within the present disclosure, such alerting may take place through haptic motors, visual or audio alarms. In a similar manner, nursing home, group home or prison population segregation may be better enforced. As such, besides using the wearable electronic device 100 for analyzing the change in an individual's health condition (including infected portions of a given population), other applications, such as for firefighters, schools (particularly those that deal with autistic children), military personnel, construction workers, police officers, emergency medical technicians (EMTs) and prison inmates or the like are also within the scope of the present disclosure. References in the present disclosure to the various forms of the wearable electronic device 100, as well as to the previously-mentioned aspects, are meant to indicate that such forms or aspects may include one or more particular features, structures or related characteristics particular to the end-use need, but that each such form or aspect need not necessarily include all such particular features, structures or characteristics, and that any claimed combination of such features, structures or characteristics in part or in their entirety as described herein is has a basis in—and is therefore deemed to be within the scope of—the present disclosure.

In one form, the static version of the geofence G may be enabled by beacons placed at points of ingress or egress, such as doors or windows. In another form, beacons may be placed on adjoining properties, such as on a neighbor's residence. In one form, such alerting as to a breach (whether ingress or egress) of the geofence G may again be through haptic, visual or audio means within the PAN P, as well as having the information sent to the backhaul after which a text message is then generated and sent to the person or persons of interest, keeping in mind that such an approach is slower than when sending the message exclusively within the PAN P. In one form, the peripheral devices 200 disclosed herein may possess the necessary beacon capability, while in another form, stationary or other mobile beacons as discussed in US Published Application 2019/0209022 may be used to assist the wearable electronic device 100 and PAN P in its geofencing functionality. It will be appreciated that while the beacons that may make up one or more of the peripheral devices 200 are generally understood within the present disclosure to be of a mobile variant (in that they may be affixed to a person, animal, robotic drone, or other readily-movable host), there is no need that all such beacons must be. For example, one or more of the beacons may be stationary (such as those that are affixed a building wall, or on permanently-installed equipment), and that either variant is within the scope of the present disclosure.

As mentioned previously, PAN P may in one form be configured to have mesh topology for use in the geofence G and related tracking. Within the present disclosure, a node within a mesh network is any signal connection point that can receive, generate, store or transmit message information along one or more routes that are defined within the network. Regardless of whether each node is a source node or a non-source mode, it is clear from the figure that they may be situated at different locations within PAN P. The wearable electronic device 100 generates messages and related information for exchange with these one or more non-source nodes 200 within the geofence G as long as these non-source nodes 200 are within communication range of the wearable electronic device 100. In response, one or more of the BLE-capable devices 200 and one or more sensors $S_1$, $S_2$, $S_3$ . . . $S_n$ may be made to respond to the geofenced information such that they can then transmit such information for reception to other BLE-capable devices 200 and one or more sensors $S_1$, $S_2$, $S_3$ . . . $S_n$ that are within a communication range of the particular non-source node 200 that is initially receiving the information from the wearable electronic device 100. Moreover, when configured as a mesh network, the various BLE-capable devices 200 and remote sensors $S_1$, $S_2$, $S_3$ . . . $S_n$ may assume additional hierarchical attributes; for example, a first of the BLE-capable devices 200 may receive the geofenced message information from the wearable electronic device 100 and then retransmit such information for reception by one or more other downstream non-source BLE-capable devices 200 that are within communication range of the first non-source BLE-capable device 200. In addition, the first of the BLE-capable devices 200 may determine whether its location is within the geofence G.

As previously mentioned, location or position information of the BLE-capable devices 200 and remote sensors $S_1$, $S_2$, $S_3$ . . . $S_n$ relative to the boundary of geofence G may be determined by various indoor or outdoor approaches, such as through (at least in outdoor geofence G situations) GNSS or related global positioning system (GPS), information provided by one or more fixed beacons or other approaches as disclosed in US Published Application 2019/0209022, while an indoor equivalent to geofence G may rely upon RSSI, triangulation or other known means. Based on information received from one or all forms of such indoor and outdoor sources, the location of the BLE-capable devices 200 and remote sensors $S_1$, $S_2$, $S_3$ . . . $S_n$ relative to the boundary of the geofence G may be ascertained with a relatively high degree of accuracy.

In one form, the wearable electronic device 100 could be placed on a robotic device (such as a drone or autonomous vehicle) in its data aggregation capacity. Such an approach could be particularly beneficial for situations where a disease outbreak is either suspected or already underway, thereby reducing unnecessary exposure of health-care workers and other personnel that are either tracking or responding to the outbreak.

Figure 4:
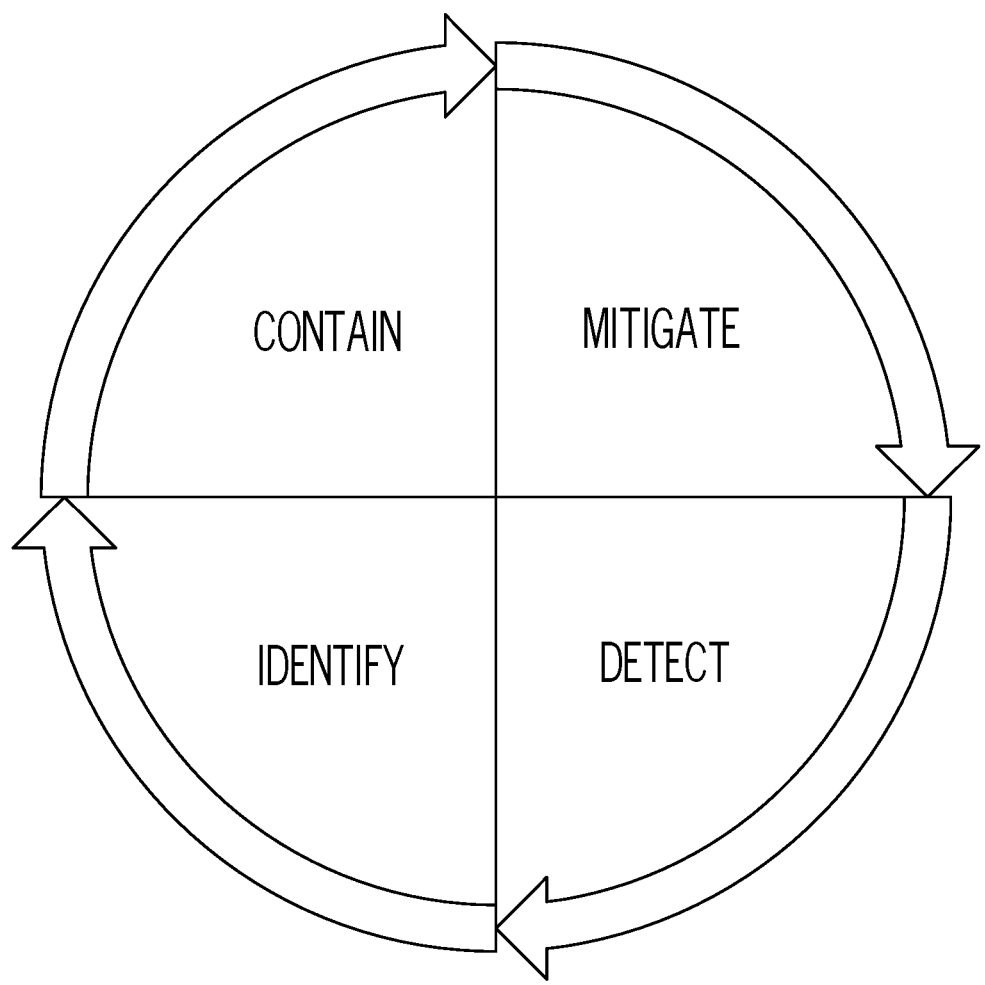
FIG. 4 depicts a perpetual circle showing a summary of strategies used to control the spread of a contagious disease and that includes identification and testing functions that can be performed by the PAN discussed herein.

Referring next to FIG. 4, a perpetual circle showing how to control the spread of a communicable disease or related event through a combination of mitigation, detection, identification and containment. The identification component of the perpetual circle can be in the form of contact tracing and other functions discussed herein through the use of the wearable electronic device 100, system 1 and PAN P. With the knowledge gained through the identification component, mitigation activities such as the use of personal protective equipment (PPE), adhering to social distancing guidelines and (in the case of individuals who are in a group environment) visitor control. Likewise, detection may include the use of testing, temperature screening and symptom monitoring. Lastly, containment may be in the form of isolating exposed individuals and quarantining positive cases. Because the wearable electronic device 100 may be used to track and perform contact tracing, while the dashboard 700 and contact report 800 (both as discussed as follows) may be used to document and inform interested individuals.

Figure 5A:
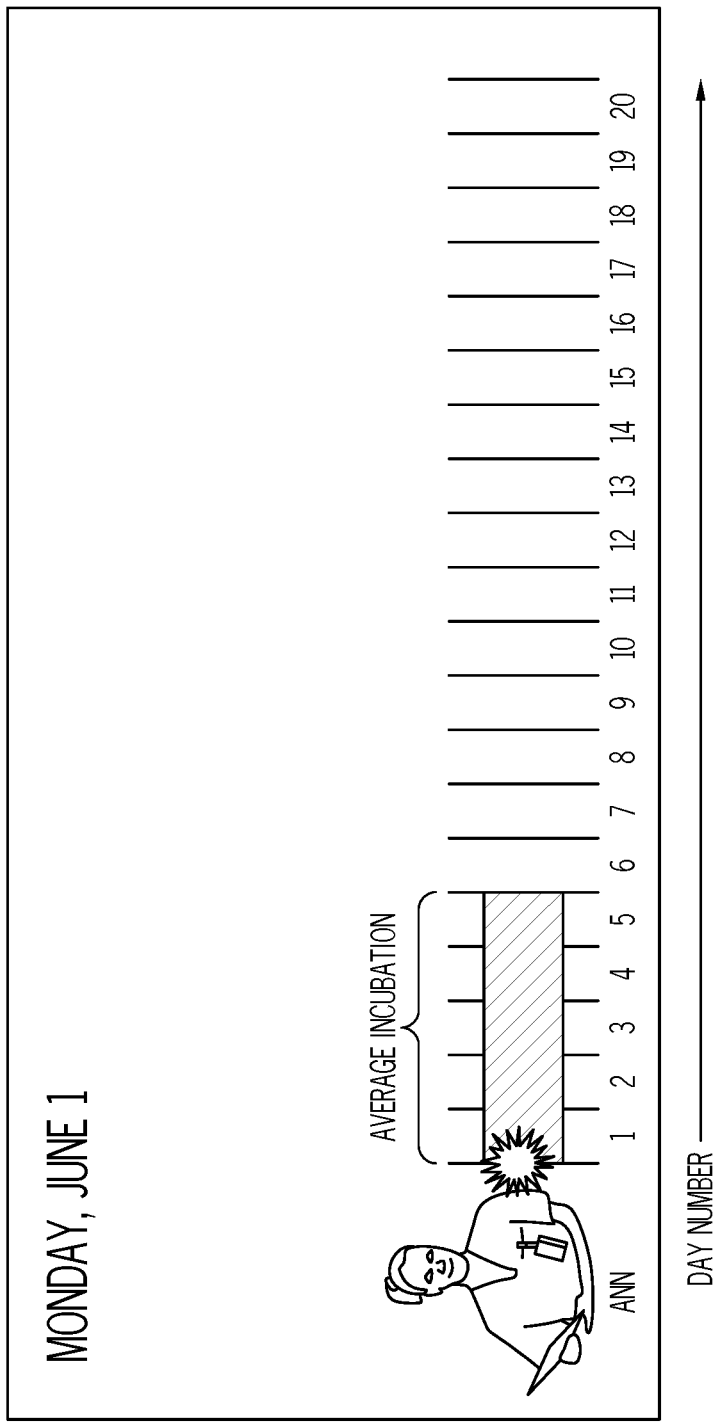
FIGS. 5A through 5D depict a conventional sequence of events of how an employee of a health care or related facility may infect at-risk residents of such facility to a contagious disease.
Figure 5B:
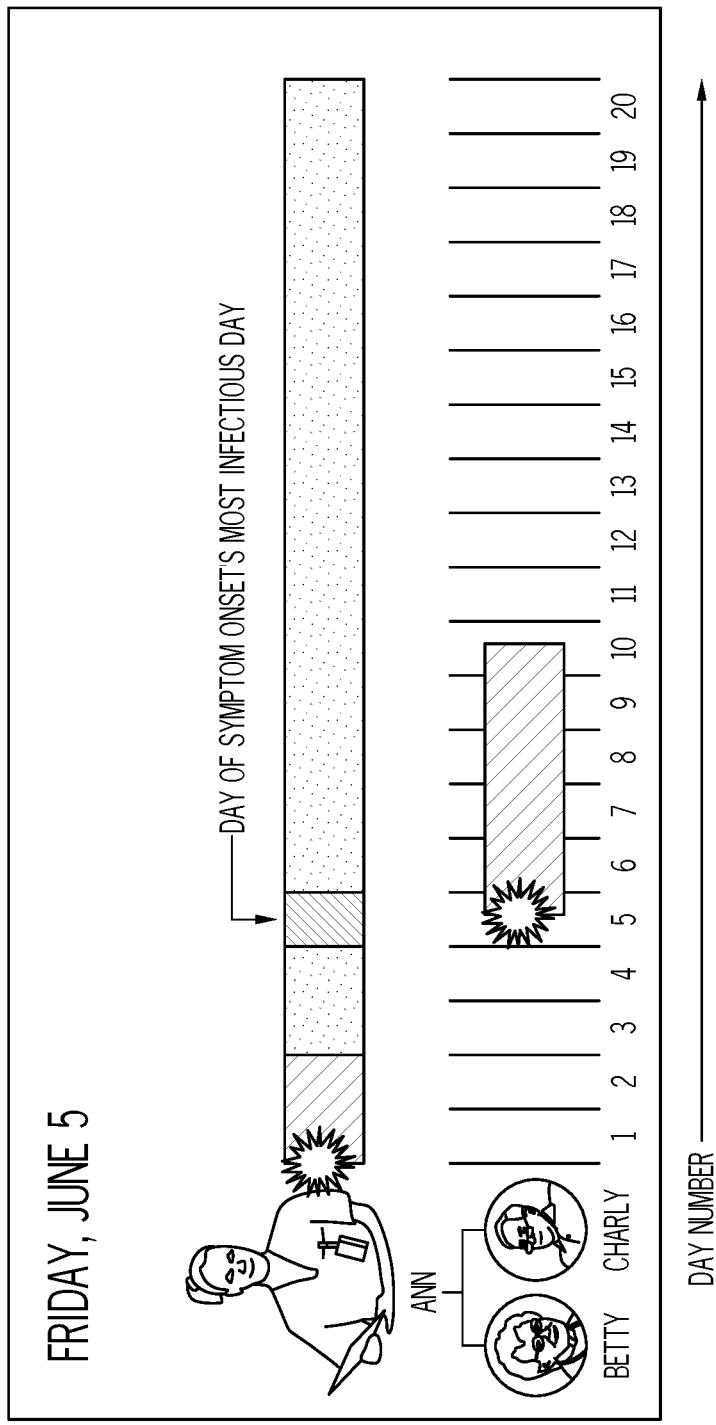
Figure 5C:
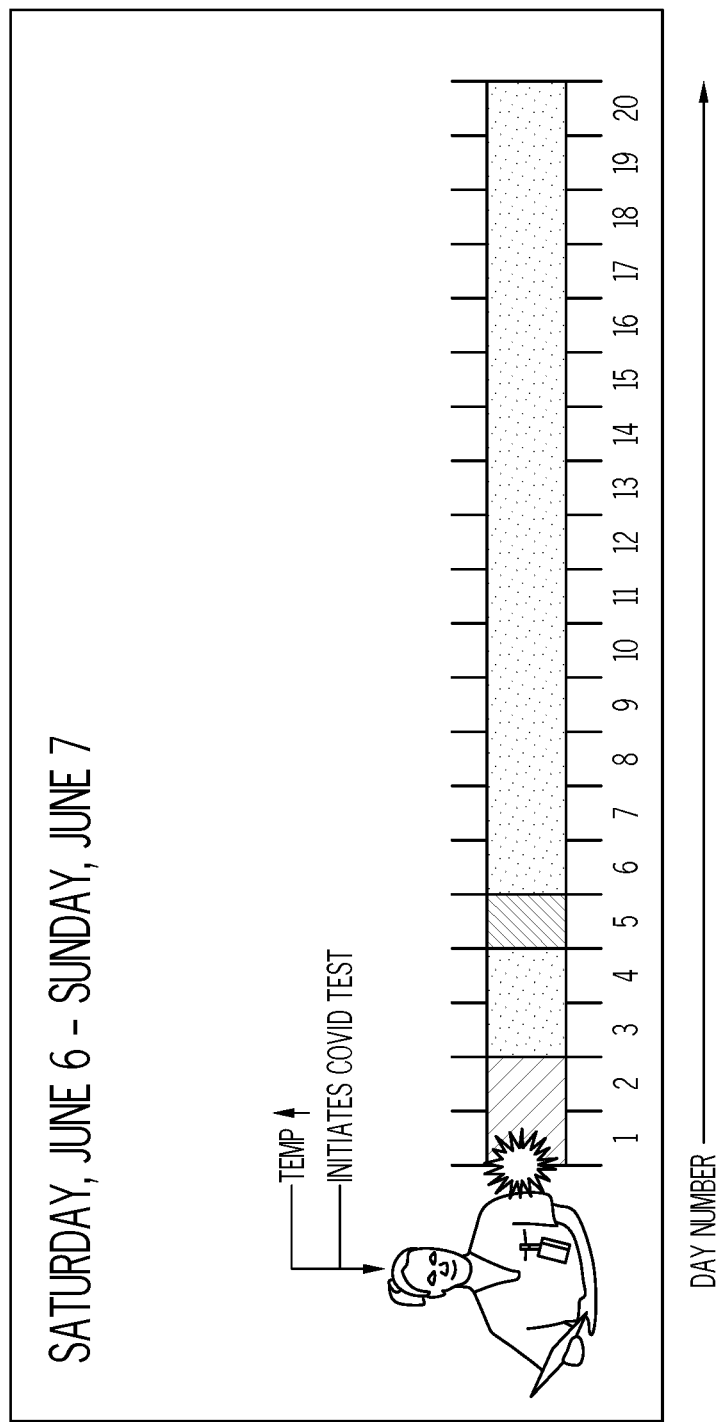
Figure 5D:
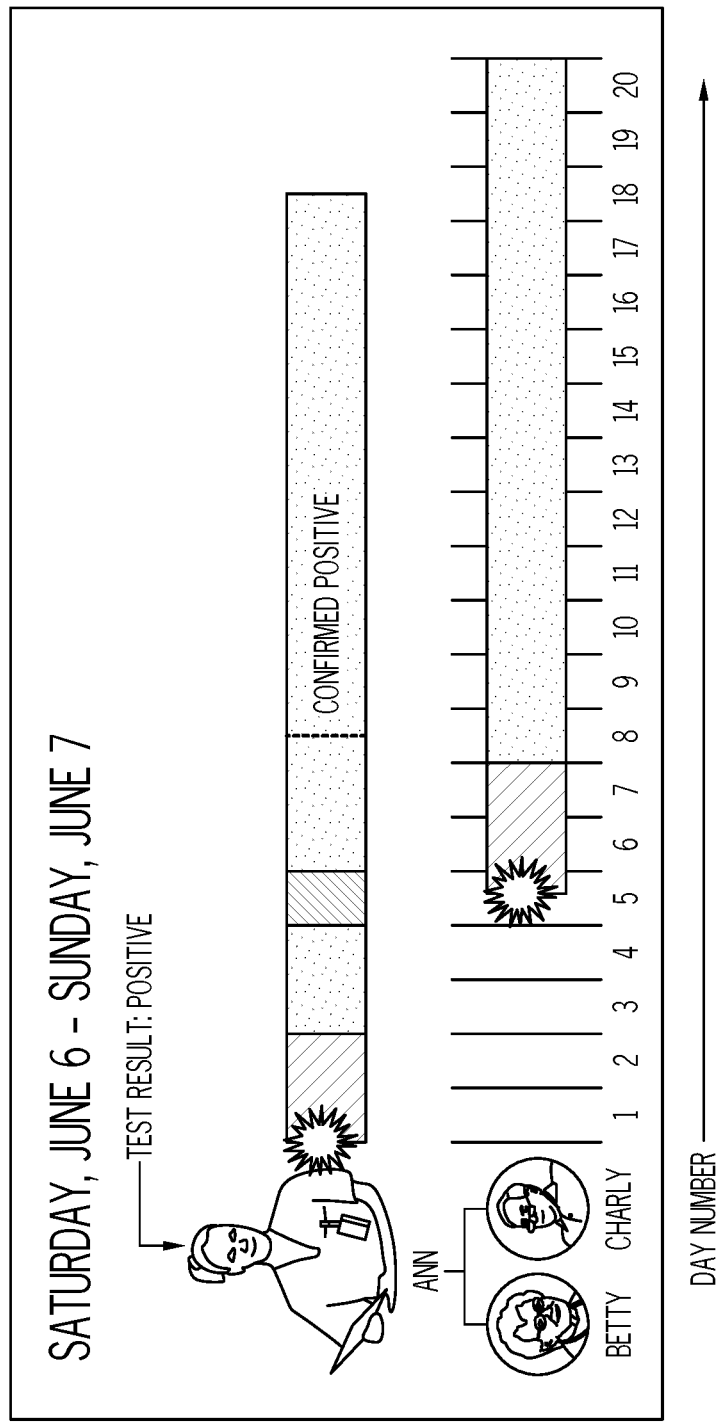

Referring next to FIGS. 5A through 5D, an example of a conventional approach to performing contact tracing is shown. Referring first to FIG. 5A, Ann, a nurse at Daisy Senior Living Facility, is exposed to SARS-CoV-2 on Monday, June 1. This is indicated as Day 0 on the horizontal timeline. It has been previously reported that due to known incubation periods, it may take approximately five days for Ann to begin developing any symptoms. Referring next to FIG. 5B, by Friday, June 5, Ann notices a runny nose and sore throat that she attributes to her allergies. Her temperature at this time is normal. While she doesn't realize it, this is the day that Ann is most infectious. Referring next to FIG. 5C, by Saturday morning, Ann has developed a fever and suspects that she may have COVID-19. She alerts her supervisor at Daisy Senior Living and goes for a COVID test. Unfortunately, her COVID test results will take a few days and the Director of Nursing that is in charge of contact tracing will not be back at Daisy Senior Living until Monday. Referring next to FIG. 5D, Ann's test comes back positive, and the Director of Nursing interviews Ann and also reviews last week's nursing assignments for the residents in order to determine who may have been exposed. During the interview, Ann recalls helping Charly with dinner but does not recall her brief but direct contact with Betty.

Referring next to FIGS. 6 through 9 in conjunction with FIGS. 1 and 3, use of the wearable electronic device 100 to overcome the shortcomings of the conventional contact tracing of FIGS. 5A through 5D is shown. In particular, by automating the contact tracing process, large teams of people, along with the concomitant potential for missed or incorrectly assessing a potential disease-spreading scenario are reduced or avoided. In this way, the accuracy with which contact tracing, proximity monitoring and hotspot detection on an infected person $P_I$ (such as Ann from the example discussed in conjunction with FIGS. 5A through 5D) is shown. In one form, it is important to keep data associated with the potentially infected person $P_{PI}$ confidential and secure, as not all cases identified as being potentially infected are in fact infected. Moreover, in certain circumstances, it may be important to keep data associated with the infected person $P_I$ similarly confidential and secure. One way to determine if an individual is infected is to subject the individual to testing or other procedures. Upon testing and the attainment of certain metrics (some of which may be determined by the machine learning models and analysis discussed herein), the potentially infected person $P_{PI}$ may be labeled or otherwise identified as testing positive and thus designated as an infected person $P_I$. In any event, all individuals who have been tested may be given a digital signature 600.

Figure 6:
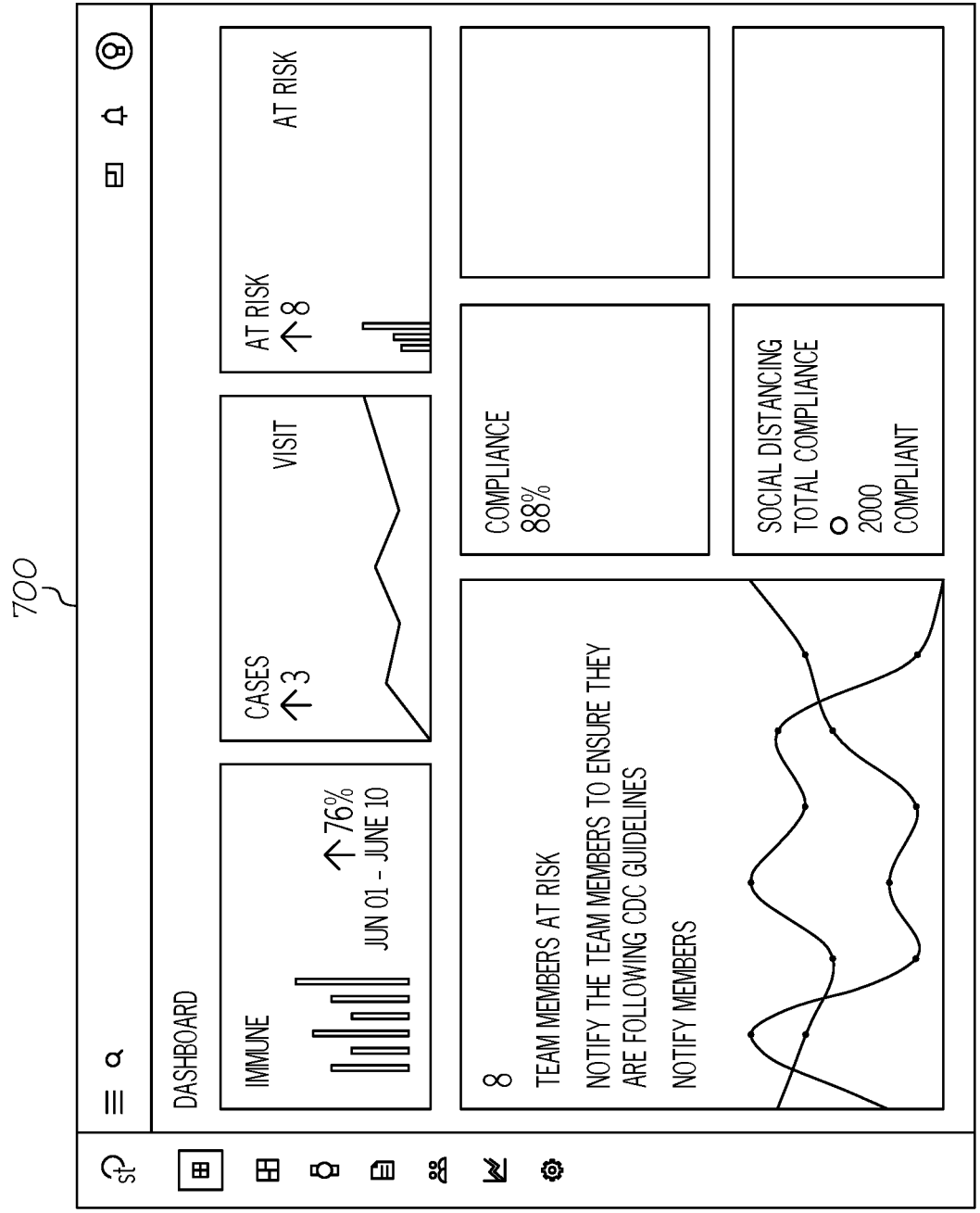
FIG. 6 depicts a notional dashboard used with the PAN disclosed herein to provide organization management for persons who may be at elevated risk of potential exposure to a contagious disease.

Referring with particularity to FIG. 6, a dashboard 700 may be used to provide displayed-based information of an event or analysis (including machine learning analysis) of an event. In one form, the dashboard 700 is configured as a web-based enterprise dashboard that can be customized (such as for a system administrator) to better manage devices, users, reports or the like. In one form, the dashboard 700 may be used for registration functions, including configuring an event-based registration such that attributes associated with people, locations, timing, incidents, adjacent environment and related content for a particular situation may be collected, recorded and categorized so that profiles may be generated for subsequent use. In one form, the dashboard 700 may be used to provide user-defined rules for the detection, proximity monitoring, contact tracing and hotspot monitoring discussed herein. In this way, when a disease outbreak occurs within a local community, the system 1 automatically generates a report of all individual that were within certain criteria thresholds such as one or more of minimum distancing, duration or the like.

Figure 7:
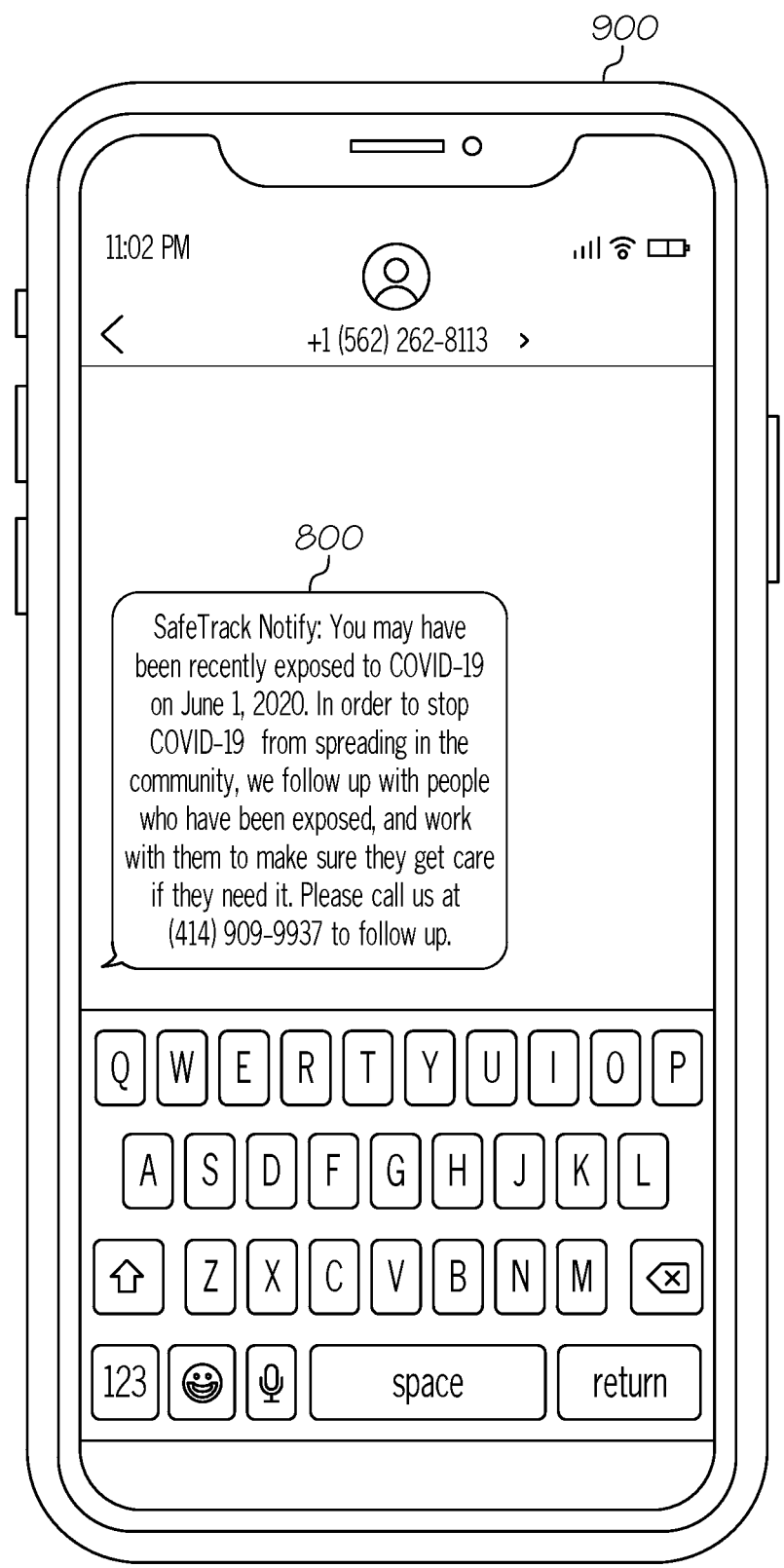
FIG. 7 depicts a notional display such as a mobile phone screen and that is used with the PAN disclosed herein to provide a notification to the one viewing the display that they may be at elevated risk of potential exposure to a contagious disease.

Referring with particularly to FIG. 7, a contact report 800 may be generated and sent to the display device 900 (such as a mobile phone screen or the like) for viewing. In one form, the dashboard 700 of FIG. 6 may be used to help configure information provided to the display device 900. For example, if the display device 900 is an employee's mobile telephone, a mobile API can be used to work in conjunction with the dashboard 700 to provide employee access to risk levels based on identified interactions, analyze past interactions, provide testing resources, healthcare provider contact information or the like. In one form, the report can be run for a specific case or group of contacts. The report 800 can be made to connect with an electronic medical record (EMR) or a case management software. The report 800 may also aggregate or display information from a nearby public health authority (PHA) or related organization that is tracking the spread of particular disease. In this way, once a case of an identified or identifiable disease occurs, the system 1 can automatically notify all close contacts through e-mail, SMS, texts, telephone calls or the like. In one form, additional functionality such as periodic check-ins with the infected person $P_I$, visitor management or the like is also provided.

Referring with particularly to FIG. 8, the contact report 800 may be in the form of a notification 810 that may be generated and sent to the display device 900 that is presently within the infected person's PAN P. In one form, the same display device 900 may receive the message if such display device 900 was determined to have been within the infected person's PAN P of the infected person $P_I$ within a preset prior time frame. In one form, use of one or more of the wearable electronic device 100, system 1 and PAN P automatically identifies direct contacts, close contacts and proximate contacts. By way of example in a healthcare facility context where nurses and other employees that are expected to have interaction with patients or residents have access to the information being generated by such wearable electronic device 100, system 1 and PAN P, such information may be used to allow the nurse or other employee to quickly generate the contact report 800 or its associated notification 810.

Figure 9:
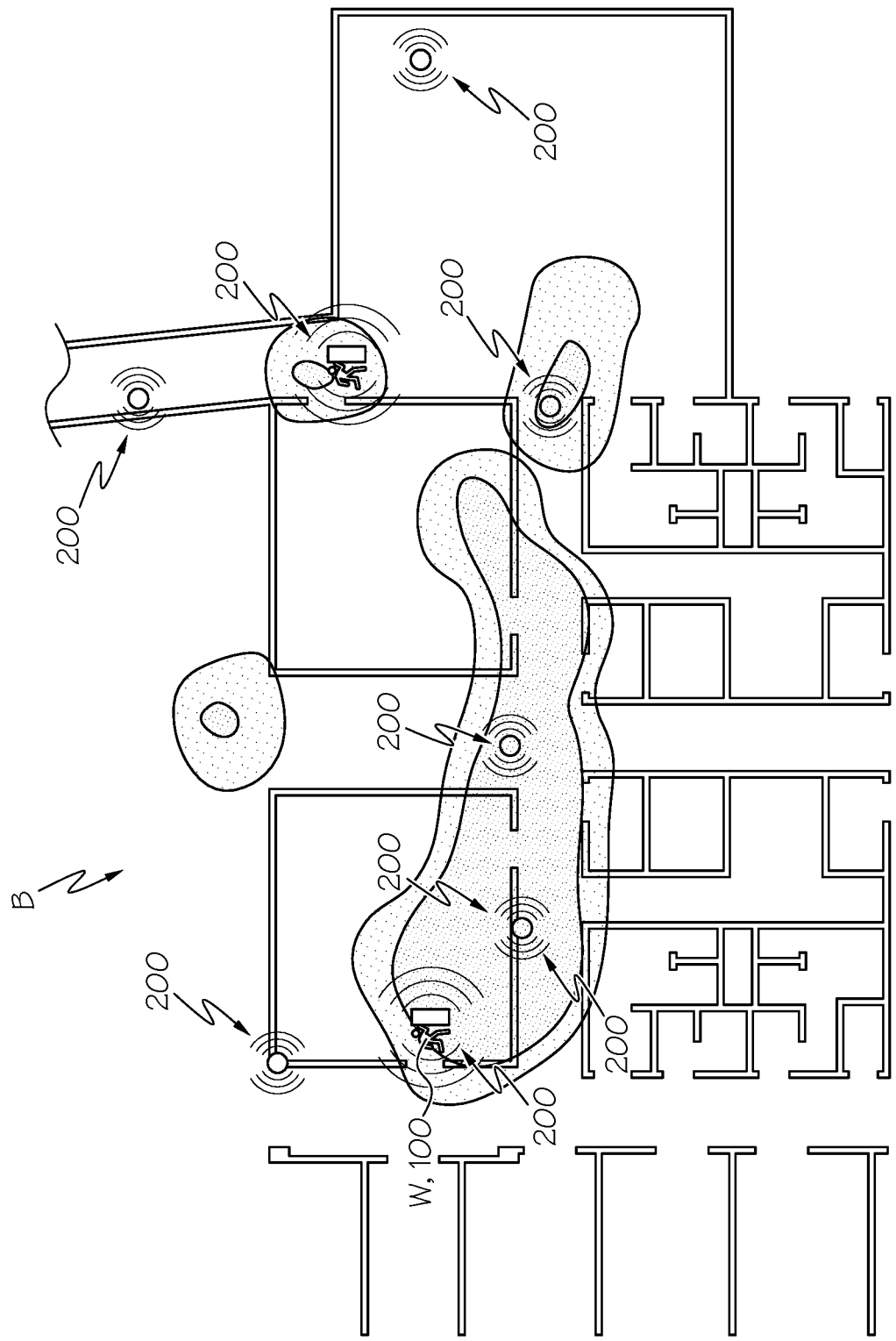
FIG. 9 discloses a room-based indoor tracking within a multi-room building where both point-of-departure warnings and color-coded representations of locations within the building of an individual that is being monitored with the wearable electronic device of FIG. 2.

Referring with particularity to FIG. 9, a thermal map hot-spot is shown overlaid on a multi-room building B. This shows the frequency with which a wearer W that is associated with the wearable electronic device 100 spends in a particular location, where such amount can be one or both of an aggregate of the number of times the individual visits a particular location as well as the amount of time (for example, in seconds, minutes or hours) spent in such location. For example, if the location is indicated to be a bathroom, and sensor data additionally acquires movements consistent with tooth brushing (such as turning on a water faucet, reaching for a toothbrush or toothpaste, and repeated small movements adjacent the individual's mouth), an inference can be drawn that the individual is brushing his or her teeth. In another form, if certain devices within the building B are configured with IoT capability (such as a smart toothbrush, to continue the present example) such that they can form one or more of the peripheral nodes 200, the wearable electronic device 100 and is associated PAN P can sense such data and proceed accordingly. It will be appreciated that such ability to acquire an individual's movement and location data is particularly helpful when other sources of wireless signal transmission (such as WiFi) are not available due to location, signal blockage, depth below ground or thickness of the building B or the like.

Referring next to FIG. 10, a flow diagram of how the wearable electronic device 100 and the data acquired therefrom may be used to develop a machine learning model. In one form, the machine learning model and related algorithms and approaches disclosed herein may be part of a larger endeavor known as human-in-the-loop (HITL) learning where additional insights gleaned from the human labeling or annotation of at least a portion of the data is used along with subsequent (often empirically-based or experienced-based) validation, particularly during training and associated testing activities.

In particular, the flow diagram forms a program structure in that it is depicted as an ordered sequence of particular and tangible steps associated with the previously-mentioned machine learning workflow 1000. In one form, this ordered sequence may be used to provide predictive analytics to assist in contact tracing or related diagnoses as discussed herein. This sequence may include one or more of the following steps: (1) a raw data acquisition (first) step 1100; (2) a raw data cleansing or preprocessing (second) step 1200; (3) a feature extraction (third) step 1300 of derived values which may include placing the data into feature vector or related form; (4) a training (fourth) step 1400 for iterating the machine learning algorithm through testing, calibration or (in the case of HITL) additional insights gained from human experience or other observations; and (5) a model use or (fifth) step 1500 with which to operate the trained machine learning model on some or all of the acquired data in order to draw inferences from such acquired data. It will be appreciated that the first three steps 1100, 1200, 1300, as the data management portion of the machine learning workflow 1000, may be performed independently—as well as part of—the training step 1400 and inference step 1500 for any particular machine learning-based analysis. Likewise, some or all of these steps may be performed on a remote computing platform, where at least the first, second, third and fifth steps may be performed either on the wearable electronic device 100, and that all such variants are within the scope of the present disclosure. In one form, the process of converting data that is taken from sensors $S_1, S_2, S_3 \ldots S_n$ into a form suitable for use in a machine learning algorithm may form part of an activity known as extraction, transformation and loading (ETL) that may make up part of the previously-discussed second and third steps 1200, 1300 of the machine learning workflow 1000. Within the present context, ETL may be used to decompose multi-sensor data into a suitable feature vector within a given feature space.

The use of the information generated by collection of sensed data (such as the aforementioned LEAP data, including data acquired by the various sensors $S_1 \ldots S_n$) by the wearable electronic device 100 and PAN P may be done in a spatio-temporal way that helps to better perform a time series analysis to in turn better identify the likelihood of spread of a communicable disease. In one form, the time series nature of the acquired data (for example, ambulatory data) can be subjected to predictive analytics (including analytics arising out of the use of one or more of the machine learning models discussed herein) as a way to predict or otherwise forecast arbitrary future location, activities or behaviors.

Such temporal data may include—in addition to time stamping—frequency of occurrence, duration of occurrence, elapsed time between occurrences, running averages of occurrences or the like. In one form, the measurement of the temporal data helps in establishing norms, such as those that may form part of an inter-patient or intra-patient baseline data. This indexing of the data over the time dimension is valuable in helping to identify movement traits, patterns or the like that in turn may be correlated to interactions with other people and which may bring to bear additional data for the determination of a possible spreading event. As with other forms of acquired data, the temporal data may be subjected to a feature extraction process (such as included in step three of the machine learning workflow 1000) in order to allow comparison of potentially disparate pieces of information. For example, because various activities $S_1$, $S_2$, $S_3 \ldots S_n$, it may be beneficial to recognize such activities over one or more time-sampled sliding windows. Because the received data is unlikely to be identical (even for the same individual performing the same activity), it may be helpful to use statistical or structural filters in order to transform the raw data into a set of feature vectors for each given window.

Figure 11:
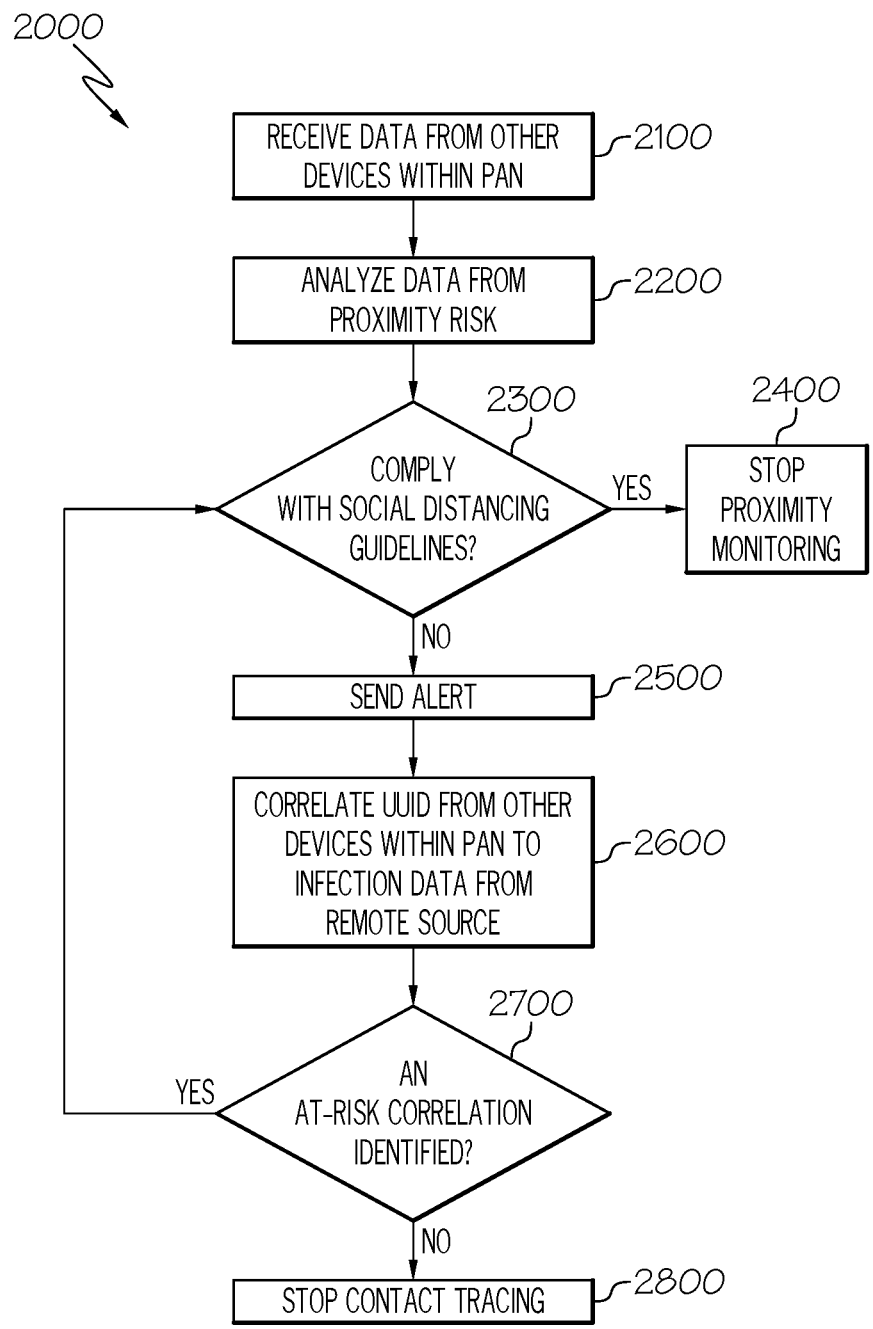
FIG. 11 depicts a program structure in the form of a flow diagram of how to perform at least one of contact tracing, proximity monitoring and hotspot detection.

Referring next to FIG. 11, a program structure 2000 in the form of a flow diagram of how to perform at least one of contact tracing, proximity monitoring and hotspot detection is shown. Although not shown, it will be appreciated that the geofence G of FIG. 3 may be set up in addition to—or in place of—one or more of these functionalities. In one exemplary form, the flow diagram forms the program structure 2000 while various arrays (including multidimensional arrays) of event data, linked lists, trees or the like form data structures. Both of these forms of structures constitute specific, tangible features or elements that may recited in one or more of the claims and that help to illustrate the architecture and operation of the various forms of the wearable electronic device 100, PAN P and system 1. Thus, by describing the various computer software elements in conjunction with the various functional activities that are depicted in the flow diagram of FIG. 11 (as well as all related flow diagrams that are not presently shown but that correspond to particular contact tracing, proximity monitoring, hotspot identification or geofencing activities as discussed herein), the machine code 173E cooperates with one or both of the processor 173A and memory 173B to perform a set of particular manipulations of the acquired event data (including its LEAP data variants) to constrain the operation of one or both of the wearable electronic device 100, PAN P and system 1 in a particular way for the purposes of identifying patterns that may be useful in preventing the spread of a communicable disease.

Initially, event data is received from one or more of the peripheral nodes 200 (which may correspond to one or more devices associated with, carried by or worn by other people) into the wearable electronic device 100, this is shown as event 2100. Second, proximity risk data may be analyzed based at least in part on location data that corresponds to a distance between the wearable electronic device 100 and the peripheral node (or nodes) 200, this is shown as event 2200.

Next, an inquiry may be made in event 2300 may be generated to determine if social distancing guidelines are satisfied by the proximity risk data. In the event that such distancing guidelines are satisfied, no further proximity monitoring may be needed, as shown in event 2400, while event 2500 shows that an alert be sent in the event that social distancing guidelines are not satisfied by the proximity risk data. Event 2600 includes correlating information that uniquely identifies particular ones of the peripheral nodes 200 to infection data (such as that from the cloud 500 or other remote database) in order to determine at event 2700 whether or not a contact risk has been confirmed. Depending on whether there is or is not a risk determines whether the inquiry returns to event 2300 or terminates at event 2800).

In one particular form (not shown) of the program structure 2000, a method of contact tracing may include configuring a wearable electronic device to form a source node for a personal area network, determining, by the wearable electronic device, if at least one peripheral node is within wireless signal communication of the personal area network, acquiring, by the wearable electronic device, event data that is being transmitted thereto from the at the least one peripheral node, wirelessly transmitting, by the wearable electronic device, at least a portion of the acquired event data to a receiver using an LPWAN that is enabled by the wireless communication module, wirelessly receiving over the LPWAN, by the wearable electronic device, information pertaining to a first individual, correlating, by the wearable electronic device, the information pertaining to the first individual to the at least one peripheral device and in the event that the correlation establishes a positive match, informing, by the wearable electronic device, a second individual that such second individual is at risk of being exposed to a communicable disease.

Within the present disclosure, the term "wearer" is meant to include a person, whether infected with a contagious disease or other known medical condition or not. In addition, the term may be applied to a person who is in need of health or location monitoring through the wearable electronic device 100, regardless of whether such person is or is not infected or at risk of becoming infected. Such other people may include those that are under the present care of a family member, doctor, nurse or other professional caregiver. In yet another form, the wearer may be a dog, cat, other pet, livestock or the like that may benefit from the geofencing capability discussed herein. Accordingly, the various terms used herein to identify the wearer of the wearable electronic device 100 as a "wearer", "person", "user", "individual" or "patient" are deemed to be equivalents within the present disclosure, and that any greater degree of specificity of such terms will be apparent from the context.

Within the present disclosure, it will be understood that the operations, functions, logical blocks, modules, circuits, and algorithm or model steps or events described may be implemented in hardware, software, firmware or any combination thereof. Moreover, if implemented in software, such operations may be stored on or transmitted over as one or more instructions or code on a computer-readable medium. The steps or events of a method, algorithm or ensuing model disclosed herein may be embodied in a processor-executable software module, which may reside on a tangible, non-transitory version of such computer-readable storage medium such that the medium be in any available form that permits access to the events or steps by a processor or related part of a computer. By way of example, and not limitation, such non-transitory computer-readable medium may comprise RAM, ROM, EEPROM, CD-ROM or other optical disk storage, magnetic disk storage or other magnetic storage devices, flash memory or any other form that may be used to store desired program code in the form of instructions or data structures and that may be accessed by a processor or related part of a computer. Combinations of the above should also be included within the scope of non-transitory computer-readable media. Additionally, the operations of a method, algorithm or model may reside as one or any combination or set of codes or instructions on a tangible, non-transitory machine readable medium or computer-readable medium, which may be incorporated into a computer program product.

Within the present disclosure, terms such as "preferably", "generally" and "typically" are not utilized to limit the scope of the claims or to imply that certain features are critical, essential, or even important to the disclosed structures or functions. Rather, these terms are merely intended to highlight alternative or additional features that may or may not be utilized in a particular embodiment of the disclosed subject matter. Likewise, it is noted that the terms "substantially" and "approximately" and their variants are utilized to represent the inherent degree of uncertainty that may be attributed to any quantitative comparison, value, measurement or other representation. As such, use of these terms represents the degree by which a quantitative representation may vary from a stated reference without resulting in a change in the basic function of the subject matter at issue.

Within the present disclosure, the use of the prepositional phrase "at least one of" is deemed to be an open-ended expression that has both conjunctive and disjunctive attributes. For example, a claim that states "at least one of A, B and C" (where A, B and C are definite or indefinite articles that are the referents of the prepositional phrase) means A alone, B alone, C alone, A and B together, A and C together, B and C together, or A, B and C together. By way of example within the present disclosure, if a claim recites that data is being acquired from at least one of a first sensor, a second sensor and a third sensor, and if such data is being acquired from the first sensor alone, the second sensor alone, the third sensor alone or any combination of the first, second and third sensors, then such data acquisition satisfies the claim.

Within the present disclosure, certain terms are used to establish a degree of connectivity or related structural, physical, electrical, signal or other cooperation between various components, as well as between such components and users or wearers of the wearable electronic device. Such terms, such as "associated with" or the like, are understood to form an exclusive or non-exclusive relationship between the components or wearers to which they refer, and will be understood as one or the other, depending on the context.

Having described the subject matter of the present disclosure in detail and by reference to specific embodiments, it is noted that the various details disclosed in the present disclosure should not be taken to imply that these details relate to elements that are essential components of the various described embodiments, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure may be identified as preferred or particularly advantageous, it is contemplated that the present disclosure is not necessarily limited to these aspects.

It will be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A communication network comprising:
a personal area network configured to wirelessly communicate signals between a source node and a peripheral node through a Bluetooth Low Energy (BLE) communication protocol, wherein:
the source node comprises a processor, a non-transitory computer readable medium, wireless communication module and machine code that are cooperative with one another to receive, transmit and analyze at least one form of data between the source node and the peripheral node, wherein the at least one form of data comprises at least one of device identifier information data, event data and personal data corresponding to an individual that is associated with the source node; and
the peripheral node is configured to (i) generate the device identifier information data that uniquely identifies the peripheral node and (ii) sense at least one form of the event data that is indicative of a proximity between the peripheral node and the source node;
an internet protocol network comprising a backhaul that includes at least one computer and at least one database with which to store and analyze at least one of the event data that has been generated by the peripheral node, the device identifier information data and the personal data; and
a low power wide area network configured to communicate signals bidirectionally between the internet protocol network and the personal area network through at least one gateway and the source node, whereupon receipt within the backhaul of the personal data that accompanies authentication of the individual to the source node and subsequent proximity within the personal area network between the individual, source node and peripheral node, the event data that is generated by the peripheral node is signally conveyed over the personal area network, low power wide area network and internet protocol network for receipt and operation upon in the backhaul after which notification corresponding to an authorization status of the individual and the source node that is based on the personal data and the event data is transmitted from the backhaul through the internet protocol network, low power wide area network and personal area network to at least one of the source node and the peripheral node.

2. The communication network of claim 1, wherein the source node comprises a wearable electronic device.

3. The communication network of claim 2, wherein the machine code comprises machine code to cause the personal area network to perform at least one of self-configuration, self-registration and self-calibration.

4. The communication network of claim 2, wherein the event data is selected from the group consisting of location, environmental, activity and physiological data.

5. The communication network of claim 2, wherein the machine code further comprises machine code to conduct a machine learning model to perform an analysis on the received event data prior to transmitting such data using the low power wide area network protocol.

6. The communication network of claim 5, wherein the machine learning model comprises an ensemble model selected from the group consisting of boosting, bagging, stacking and combinations thereof.

7. The communication network of claim 5, wherein the machine learning model comprises a workflow configured to perform at least data acquisition, preprocessing and extraction such that the output is in the form of a feature vector of at least one of the received data.

8. The communication network of claim 2, wherein the machine code further comprises machine code to form a dynamic geofence around the individual.

9. The communication network of claim 2, wherein transmission over the low power wide area network takes place through a LoRaWAN protocol.

10. The communication network of claim 2, wherein the machine code is stored in the non-transitory computer-readable medium and operated upon by the processor in order to:
cause the wireless communication module of the wearable electronic device to receive the device identifier information data and event data from the peripheral node that is within range of the wearable electronic device within the personal area network; and
cause the wireless communication module to transmit the device identifier information data and event data to the at least one gateway over the low power wide area network.

11. The communication network of claim 2, wherein the backhaul comprises at least one of a network server, an application server and the cloud.

12. The communication network of claim 2, wherein the personal area network comprises user identification information of an individual that is assigned to the peripheral node.

13. The communication network of claim 2, wherein the peripheral node is configured to send the device identifier information directly to the wearable electronic device.

14. The communication network of claim 2, wherein the communication network is situated within an industrial setting.

15. The communication network of claim 14, wherein the peripheral node is stationary by being affixed to either a building wall or placed on permanently-installed equipment within the industrial setting.

16. The communication network of claim 2, wherein the internet protocol network is further configured to place the notification that is being sent by the backhaul in signal communication with an administrator-based remote computing device.

17. The communication network of claim 2, wherein the personal data further comprises at least one of location data, environmental data, activity data and physiological data.

18. The communication network of claim 2, wherein the personal area network is further configured to form a dynamic geofence such that after proximity within the personal area network between the individual, wearable electronic device and peripheral node has been established, upon subsequent lack of proximity between the wearable electronic device and the peripheral node, the wearable electronic device generates an alert corresponding to such lack of proximity.

19. The communication network of claim 2, wherein the peripheral node comprises at least one sensor that transmits at least parameter of the at least one sensor to the wearable electronic device.

20. The communication network of claim 19, wherein the event data comprises data corresponding to changes within the environment in which the at least one sensor is placed.

\* \* \* \* \*